Oct. 29, 1963 A. C. REYNOLDS, JR., ETAL 3,109,089

DATA TRANSMISSION APPARATUS

Filed Sept. 21, 1959 21 Sheets-Sheet 1

INVENTORS
Andrew Craig Reynolds, Jr.
Oliver Henry Chalker, Jr.
John Francis Carragan
Edward Joseph Gutowski
BY
Blair, Spencer + Buckles
ATTORNEYS

DATA TRANSMISSION APPARATUS

DATA TRANSMISSION APPARATUS

INVENTORS
ANDREW C. REYNOLDS, JR.
OLIVER H. CHALKER, JR.
JOHN F. CARRIGAN
EDWARD J. GUTOWSKI
BY
Blair, Spencer & Buckles
ATTORNEYS Oct. 29, 1963 A. C. REYNOLDS, JR., ETAL 3,109,089

DATA TRANSMISSION APPARATUS

Filed Sept. 21, 1959 21 Sheets-Sheet 5

INVENTORS
Andrew Craig Reynolds, Jr.
Oliver Henry Chalker, Jr.
John Francis Carragan
Edward Joseph Gutowski
BY
Blair, Spencer & Buckles
ATTORNEYS

DATA TRANSMISSION APPARATUS

Filed Sept. 21, 1959 21 Sheets-Sheet 6

INVENTORS
Andrew Craig Reynolds, Jr.
Oliver Henry Chalker, Jr.
John Francis Carragan
Edward Joseph Gutowski
BY
Blair, Spencer & Buckles
ATTORNEYS INVENTORS
Andrew Craig Reynolds, Jr.
Oliver Henry Chalker, Jr.
John Francis Carragan
Edward Joseph Gutowski
BY
Blair, Spencer + Buckles
ATTORNEYS INVENTORS
Andrew Craig Reynolds, Jr.
Oliver Henry Chalker, Jr.
John Francis Carragan
Edward Joseph Gutowski
BY
Blair Spencer + Buckles
ATTORNEYS INVENTORS
ANDREW C. REYNOLDS, JR.
OLIVER H. CHALKER, JR.
JOHN F. CARRIGAN
EDWARD J. GUTOWSKI
BY
Blair, Spencer & Buckles
ATTORNEYS Oct. 29, 1963 A. C. REYNOLDS, JR., ETAL 3,109,089

DATA TRANSMISSION APPARATUS

Filed Sept. 21, 1959 21 Sheets-Sheet 10

INVENTORS
Andrew Craig Reynolds, Jr.
Oliver Henry Chalker, Jr.
John Francis Carragan
Edward Joseph Gutowski
BY
Blair, Spencer + Buckles
ATTORNEYS Oct. 29, 1963 A. C. REYNOLDS, JR., ET AL 3,109,089

DATA TRANSMISSION APPARATUS

Filed Sept. 21, 1959 21 Sheets-Sheet 12

Oct. 29, 1963 A. C. REYNOLDS, JR., ETAL 3,109,089

DATA TRANSMISSION APPARATUS

Filed Sept. 21, 1959 21 Sheets-Sheet 13

DATA TRANSMISSION APPARATUS

Filed Sept. 21, 1959

INVENTORS
Andrew Craig Reynolds, Jr.
Oliver Henry Chalker, Jr.
John Francis Carragan
Edward Joseph Gutowski
BY
Blair Spencer + Buckles
ATTORNEYS Oct. 29, 1963 A. C. REYNOLDS, JR., ET AL 3,109,089

DATA TRANSMISSION APPARATUS

Filed Sept. 21, 1959 21 Sheets-Sheet 15

Oct. 29, 1963 A. C. REYNOLDS, JR., ETAL 3,109,089

DATA TRANSMISSION APPARATUS

Filed Sept. 21, 1959 21 Sheets-Sheet 16

Oct. 29, 1963 A. C. REYNOLDS, JR., ETAL 3,109,089

DATA TRANSMISSION APPARATUS

Filed Sept. 21, 1959 21 Sheets-Sheet 18

INVENTORS
Andrew Craig Reynolds, Jr.
Oliver Henry Chalker, Jr.
John Francis Carragan
Edward Joseph Gutowski
BY
Blair, Spencer + Buckles
ATTORNEYS

DATA TRANSMISSION APPARATUS

Filed Sept. 21, 1959

21 Sheets-Sheet 19

INVENTORS
Andrew Craig Reynolds, Jr.
Oliver Henry Chalker, Jr.
John Francis Carragan
Edward Joseph Gutowski
BY
Blair, Spencer & Buckles
ATTORNEYS

DATA TRANSMISSION APPARATUS

Filed Sept. 21, 1959 21 Sheets-Sheet 20

United States Patent Office 3,109,089
Patented Oct. 29, 1963

3,109,089
DATA TRANSMISSION APPARATUS

Andrew Craig Reynolds, Jr., Waterbury, Oliver Henry Chalker, Jr., Litchfield, John Francis Carragan, Woodbury, and Edward Joseph Gutowski, Thomaston, Conn., assignors, by mesne assignments, to General Time Corporation, New York, N.Y., a corporation of Delaware Filed Sept. 21, 1959, Ser. No. 841,926
43 Claims. (Cl. 235—61.11)

This invention relates to information sensing and data communication apparatus and systems, and more particularly to methods and apparatus especially adapted for use in collecting, sorting, collating, and transmitting data from a number of separate sources at different locations and compiling such data at a central station. An important feature of the invention is an improved data card reading mechanism adapted to sense surface recorded information from different types of record cards, of different sizes, thicknesses, and materials, and on which coded information may be either punched, embossed, or otherwise impressed.

In the art of machine data handling and data processing, commonly referred to as automatic computing, one of the most serious problems has long been to find rapid and accurate means for feeding input information into the available high speed data processing equipment. While known types of electronic computers are capable of operating upon great quantities of data very rapidly and can solve complex problems and record accurate answers very quickly, far more time and human effort is required to assemble, sort, collate, compile, and insert the starting data which is the information that the big computers are adapted to operate upon. The labor of skilled and semi-skilled persons, who may be engaged for many hours or days in preparing the required input data, is not only costly but also susceptible of human error.

It is to these problems of facilitating, expediting, and economizing on the input of statistical data into automatic data processing systems, and to assuring greater accuracy of such information, that the present invention is broadly directed.

A preferred embodiment of the invention, as herein disclosed, is directed to use in a so-called "Transacter System" of the type generally disclosed in the copending application of Curtis Hillyer, Serial No. 556,120, filed December 29, 1955, now issued as United States Patent No. 2,918,654 of December 12, 1959, and assigned to the same assignee as the present application. In such a system the data sensing and transmitting apparatus called the "Transacter" and the centrally located receiving apparatus is called the "Compiler." The automatic communication systems for which the present invention is adapted may be used, for example, in factories where a plurality of transmitter may be installed in different areas, shops, or departments, for transmission of manufacturing data to a central accounting office. Such data may include: numbers of units manufactured, in connection with designated job orders, on particular machines; identity and hourly wage rates of the machine operators; total time required for each operation, etc. Alternatively, the apparatus of the invention may be used in warehouses and distribution centers for order receipt and delivery time information, and for inventory control purposes; or in department stores for point of origin sales data, etc. In a large factory, for example, there is at present a great deal of paper work required to be done in the various shops and departments, including such handwritten reports as time tickets for payroll entries, production and inventory control records, cost accounting, quality control inspections, scheduling, etc. For central office computing, this mass of data now has to be individually punched into cards by manual operations, and the punched cards have to be verified by human operators before they can be fed to the tabulating or computer room. Various systems which have heretofore been suggested for expediting the flow of this information into the central office have included the use of closed circuit television, which includes the added problem of human error in reading the data from the TV screen, and the use of intercommunicating telephone circuits, which frequently results in error and misunderstanding of the verbally-relayed information. In these prior art systems, the multiplicity of personnel involved results in divided responsibility, which is quite undesirable.

The principle of the transmitter system of the present invention is to capture the required information at the point of origin, select, sort, and collate it automatically and substantially instantaneously, and then to transmit infallibly the desired data to the central office where it is permanently punched into tape which can be fed directly into an automatic computer without the further intervention of possible human error.

In transaction transmitters as heretofore disclosed by Curtis Hillyer, in copending application Serial No. 686,070, filed September 25, 1957, also assigned to the present assignee, now Patent No. 3,059,847, and in the apparatus of this application, data to be transmitted are supplied by a series of punched cards and also by the manual adjustment of a series of dials to different positions. The prior disclosure employed perforated cards or tape through which electrical contacts were made to a metallic backing plate. The present invention eliminates many problems attendant to electrical sensing through perforations and provides more reliable sensing of record media which may either be punched, indented, or embossed on any type of card material. The card sensing "read-head" of the present invention is adapted to transmit data from cards "on the fly," without the necessity of intermittent motion, as heretofore required in many systems, and at increased speeds of the order of from three to five times faster than has heretofore been possible.

The improved apparatus of the present invention also includes means for transmitting manually-selected information and, in addition, preset fixed information which is automatically transmitted as prearranged upon an internal plug board. When the data cards are in proper position and the dials set to desired positions, the operator closes a circuit to the Compiler. If no other transmitter in the system is at the moment transmitting, the Compiler will immediately close a circuit which initiates the transmitting operation from the ready transmitter. If, however, the Compiler is already engaged in receiving data from other transmitter, then the transmitting operation of the ready and waiting transmitter will be initiated subsequently by the Compiler as soon as it is free to receive a message from the ready transmitter. After the operator at a transmitter station closes the circuit to the Compiler, the operation is entirely automatic, and that transmitter cannot be used again until the transmission is complete and the card sensing "read-head" is returned to its initial position. The variable dial input information is automatically locked into the transmitter when the operator closes the circuit to the Compiler, and at the completion of transmission these dials may be restored automatically to their initial positions by the operator's withdrawal of all the cards or upon operation of a reset button.

In the apparatus of the invention, the transmisson of data is effected by the passage of the "read-head" over the data cards, and the passage of a sweep over contacts in the circuits of the so-called "variable information" dials and in the plug board connections. Upon return of the read-head and the sweep to their initial positions, and the removal of the cards, all parts are automatically reset and the transmitter is freed for a second transmitting operation. The entire transmission of transaction data is normally completed in only a few seconds' time.

Accordingly, one object of the present invention is to provide a data transmitting apparatus of the character above described which can, with simple adjustments, accommodate and sense record bearing cards of different materials, sizes, shapes, and thicknesses, including the various types of cards used in electronic computers and other present-day business machines.

Another object of the invention is to provide improved card sensing means capable of rapidly and accurately detecting surface recorded information, whether punched, embossed, or otherwise impressed upon a record surface, and without the necessity of employing intermittent stop-motion between the record and the sensing means.

A further object is to provide an improved data card reading mechanism responsive to relative motion between the sensing means and a record surface, whereby recorded information may be detected and transmitted through motion of either with respect to the other.

Still a further object is to provide a data card readout mechanism in which a plurality of sensing elements are independently referenced to a record surface, whereby the accuracy of data sensing is not impaired by substantial variations in the record surface contour as may result from repeated card handling.

Another object of the invention is to provide a flexible data transmitting apparatus which can be set to transmit data pertaining to a variety of transactions, within a wide range of predetermined settings, and to remain inoperative until all items of required information have been inserted to transmit data of the particular type for which the machine has been adjusted.

An additional object is to provide a fool-proof data transmission system in which, after initiation of a message transmission, the operator cannot change the message format or content.

A further object of the invention is to provide in a system of the character above described an error detecting tie-in between the Compiler-Receiver and the transaction-transmitter, whereby a failure of any kind during the transmitting operation will produce an error indication at the transmitter. When this occurs, the transmission cycle may be repeated or, through the release button, the parts may be reset to their initial positions and the data cards may be removed or re-inserted.

A further object of the invention is to provide a transmitter to be operated by untrained personnel wherein the successive steps in the cycle are carried out automatically and wherein no transmission of the data to the Compiler will occur until all the required operations have been properly performed.

A further object of the invention is to provide a selective control, in a system of the character described, whereby each transmitter may be adjusted in advance for transmitting a number of different types of transaction messages, and one of the number may be selected by positioning a single dial, whereupon the apparatus is disabled from transmitting any other type of message.

An additional object is to provide, in data transmission apparatus of the character described, means for automatically transmitting preselected information of both fixed and variable content, including station identification and time of transmission.

Other objects of the invention will in part be obvious and will in part appear hereinafter.

For a fuller understanding of the nature and objects of the invention, reference should be had to the following detailed description taken in connection with the accompanying drawings wherein there is disclosed a preferred form of our improved transmitter as now in commercial use.

In the drawings, wherein like references identify corresponding parts:

Figure 2:
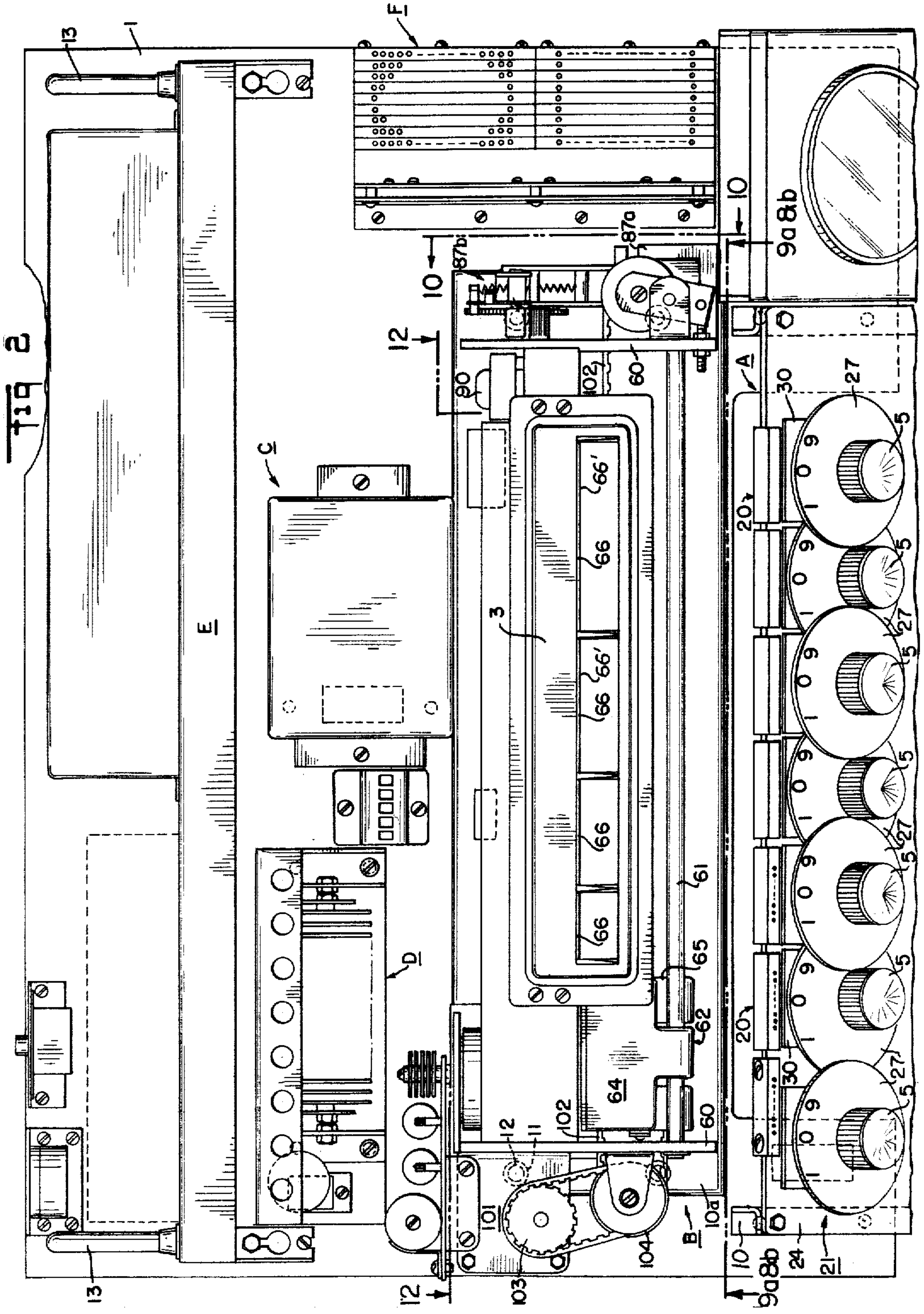
FIGURE 2 is a plan view of the entire apparatus of FIGURE 1 with the cover removed.
Figure 8:
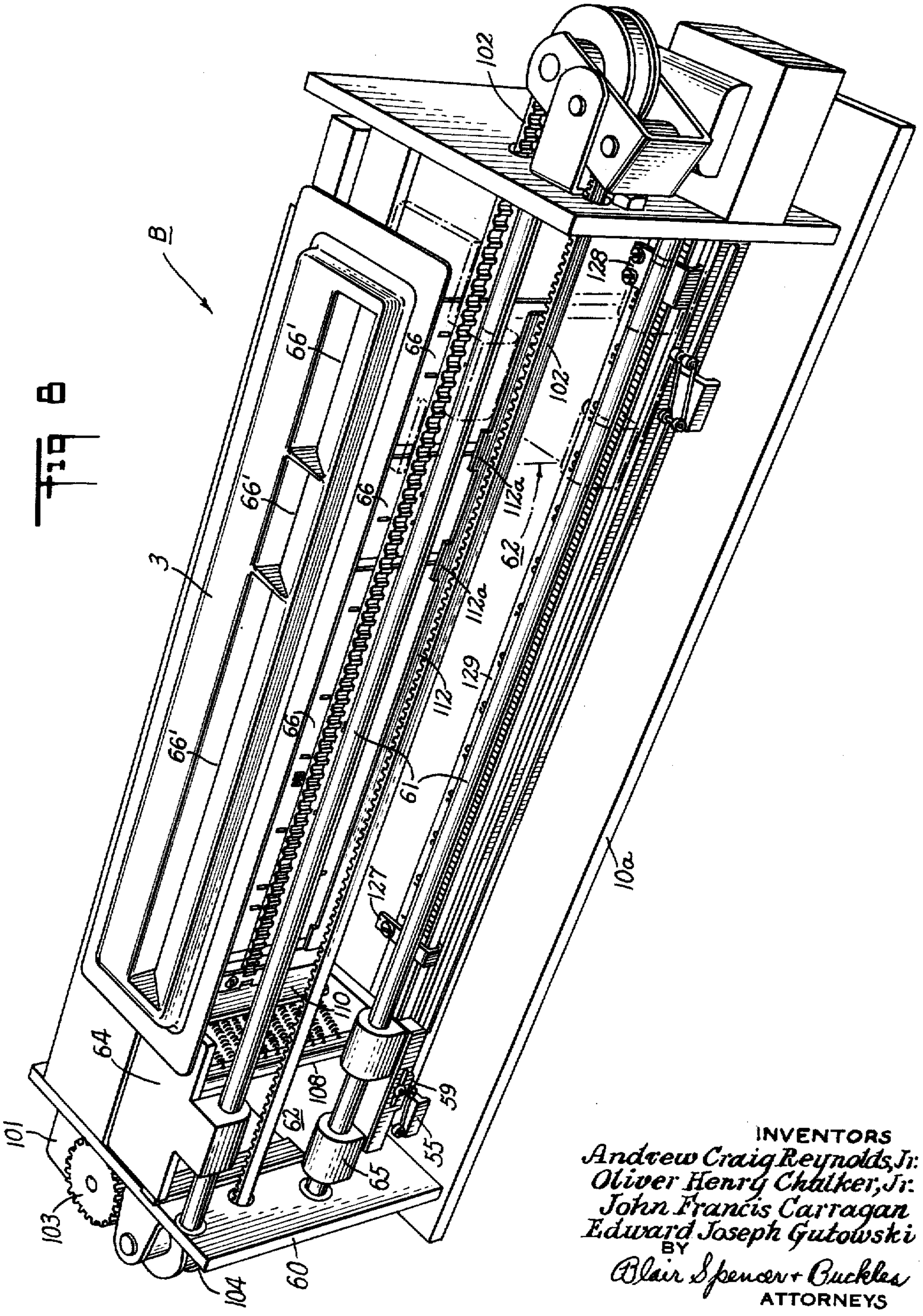
FIGURE 8 is a perspective view of the card handling mechanism of the invention, with the card reading head shown at its normal "home" position in the upper left-hand corner of the drawing.
Figure 9A:
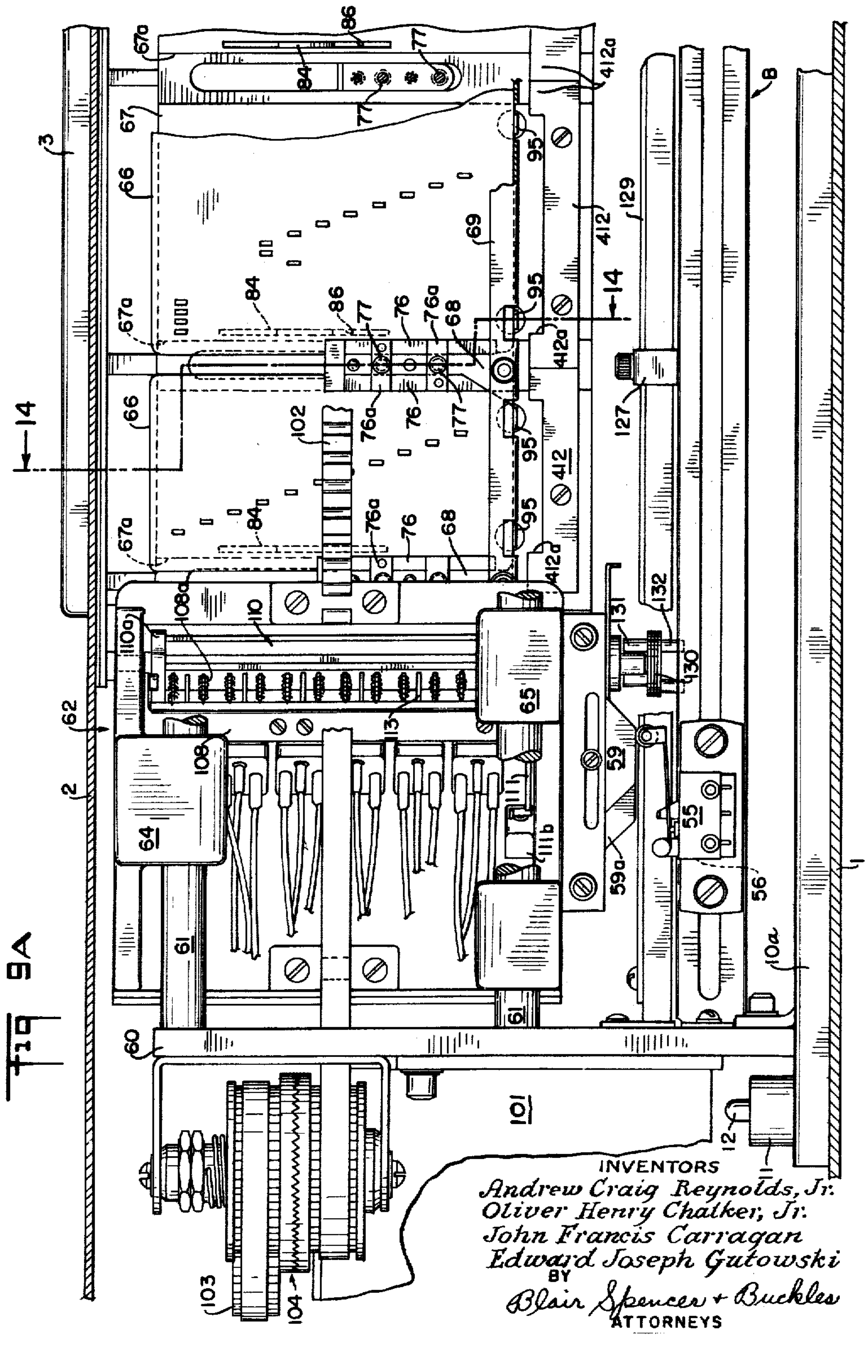
Figure 9B:
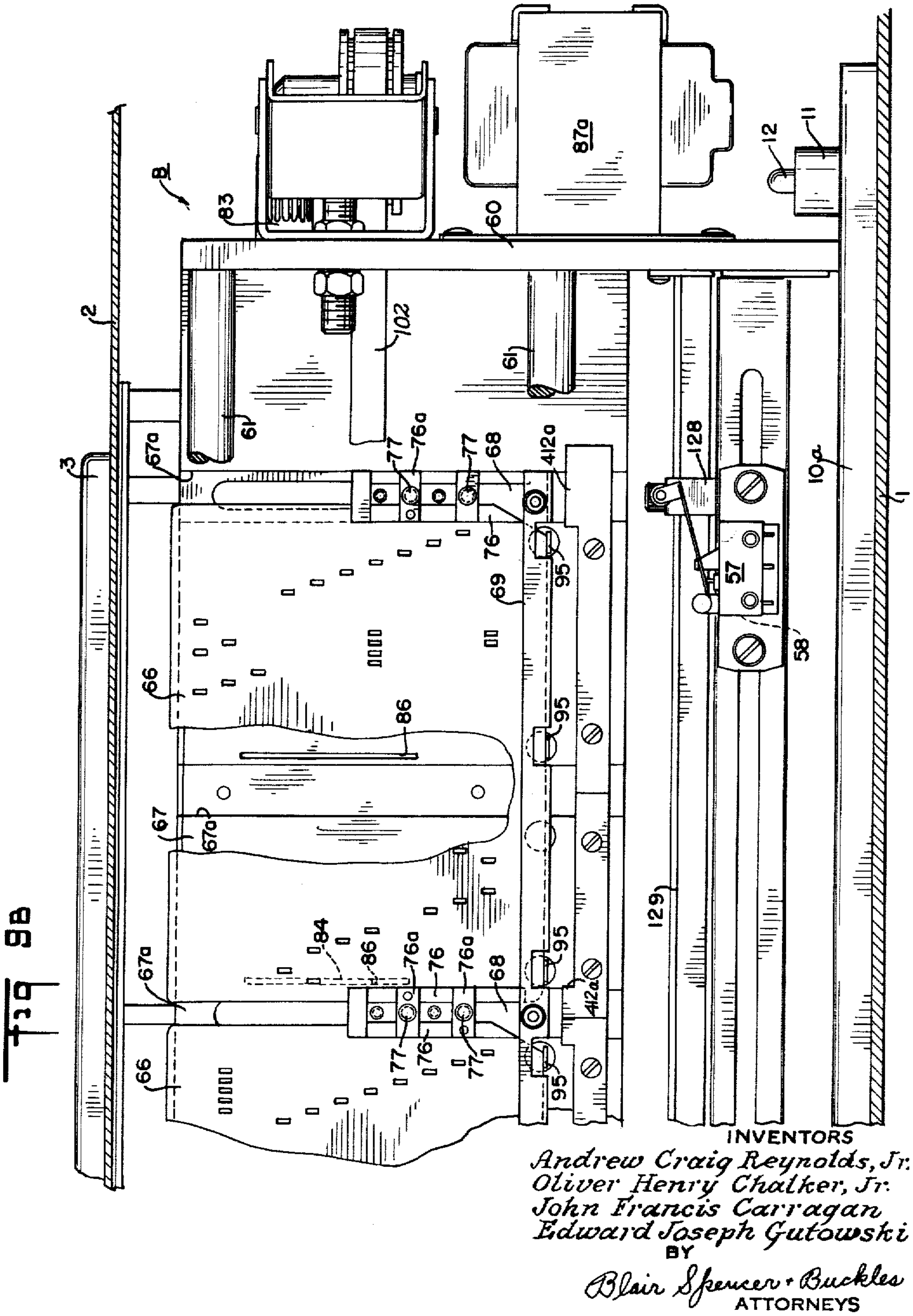
Figure 10:
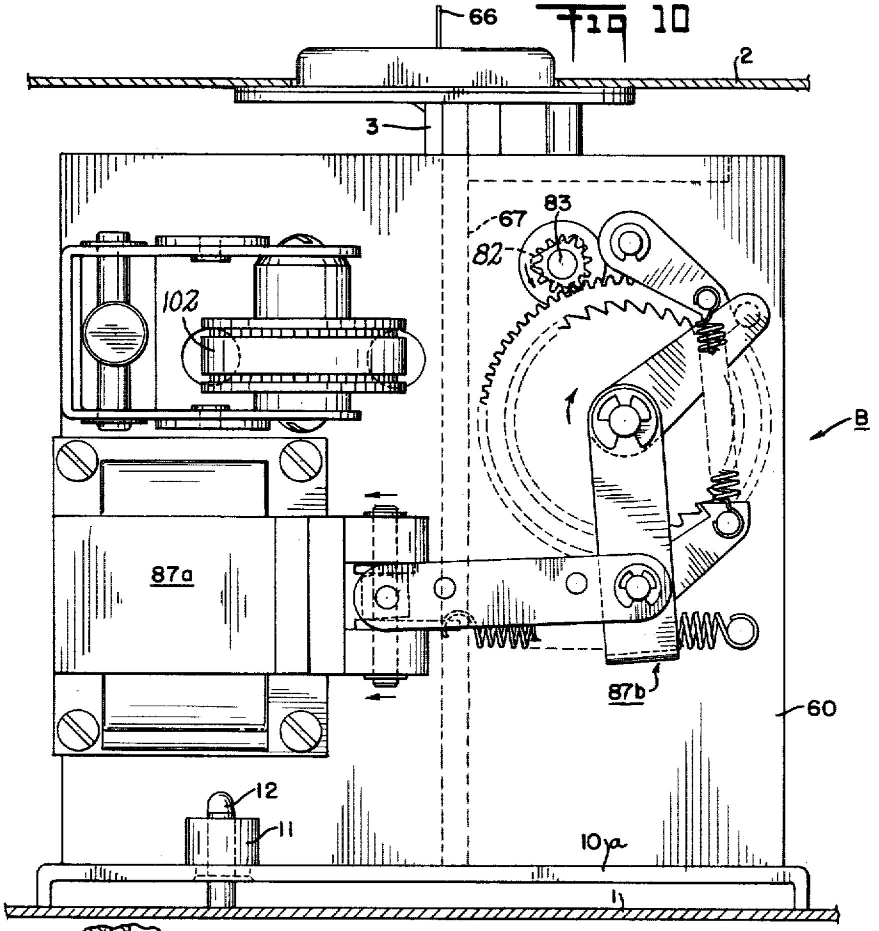
Figure 11:
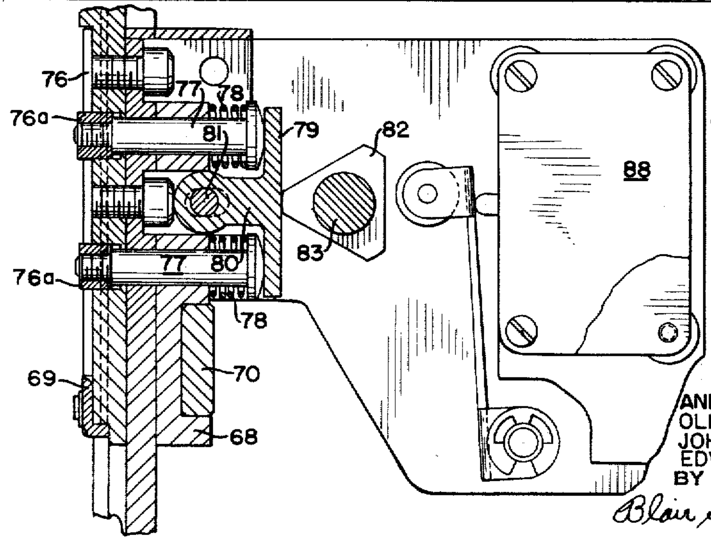
Figures 12, 13:
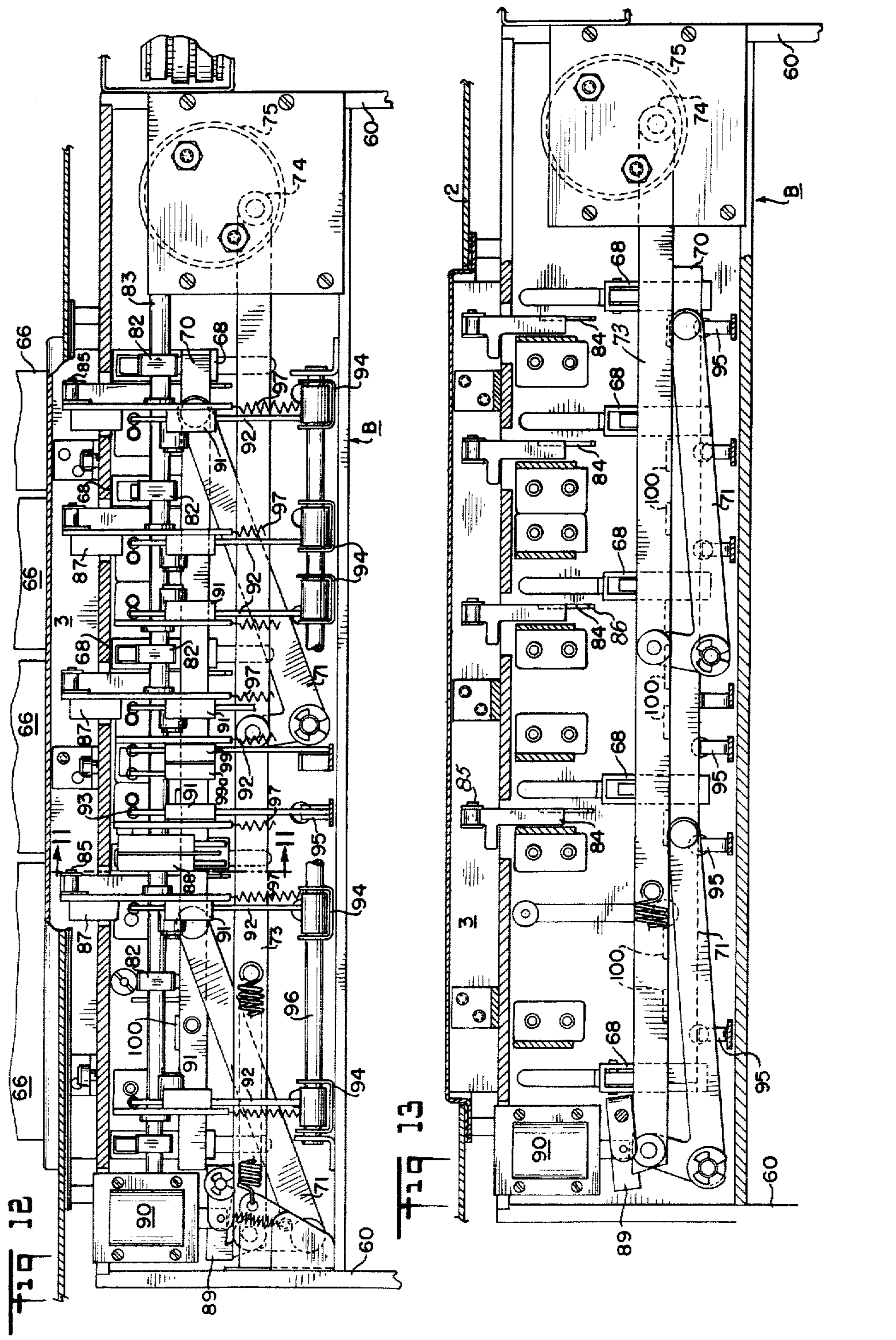
Figure 14:
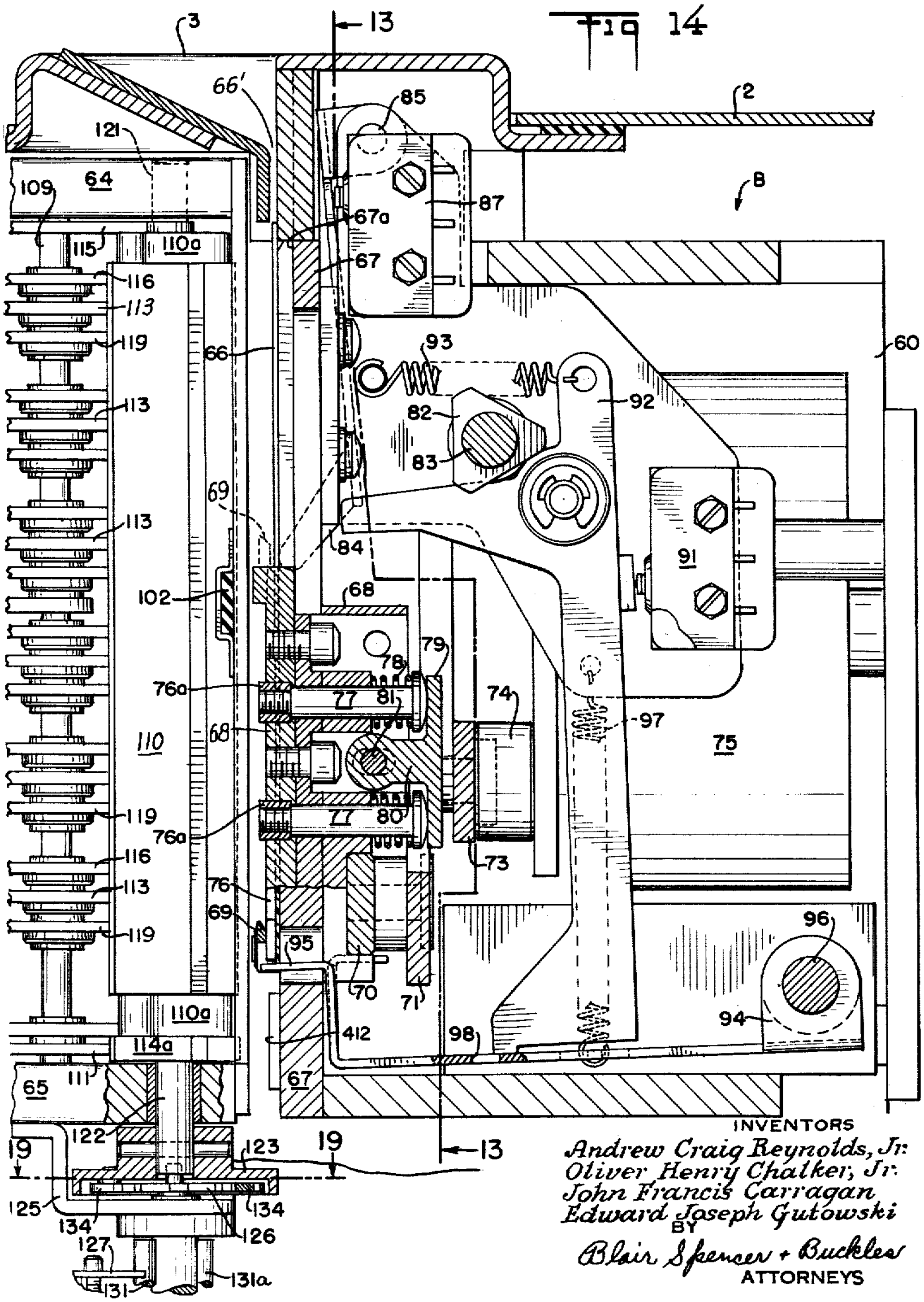
Figure 15:
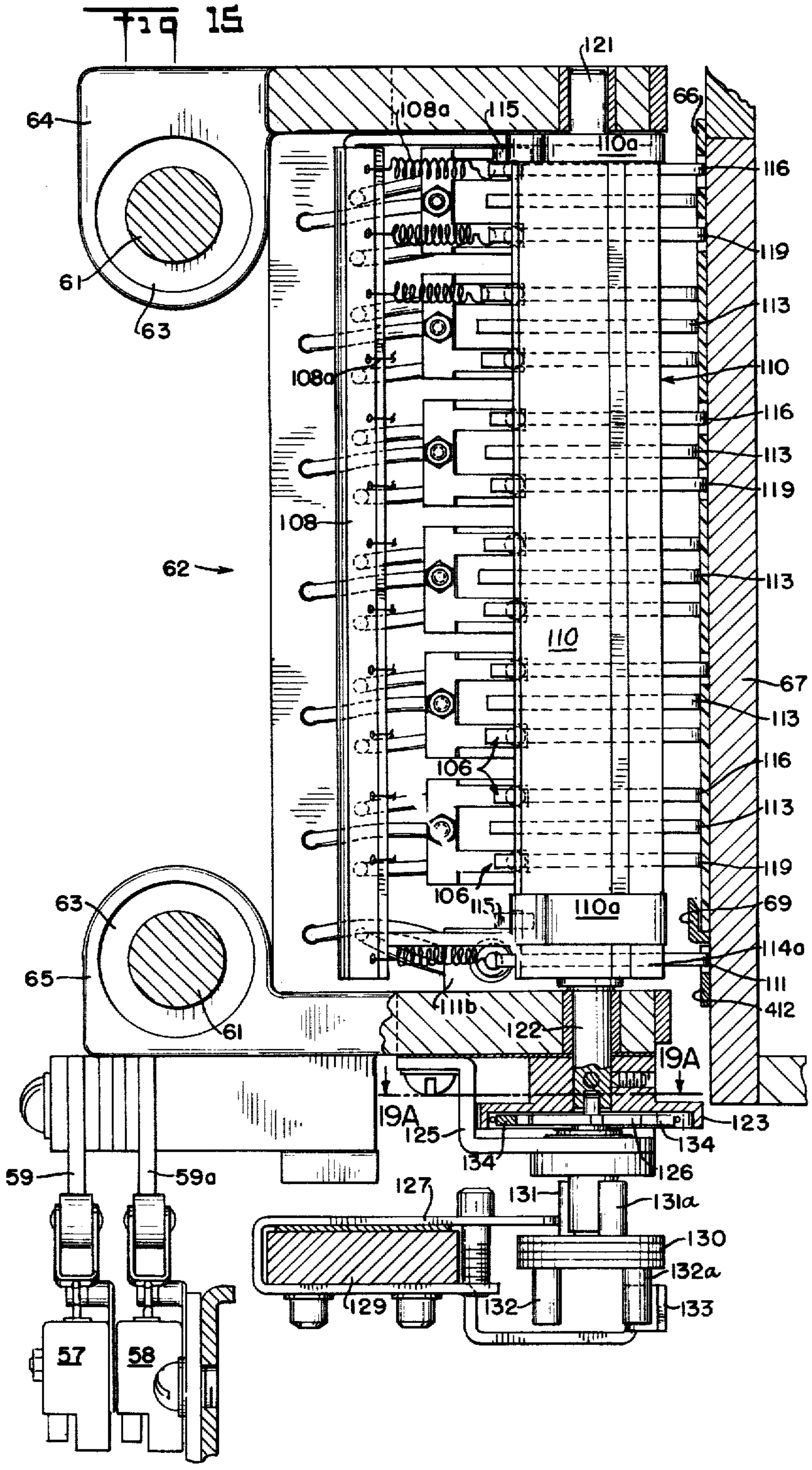
Figure 16:
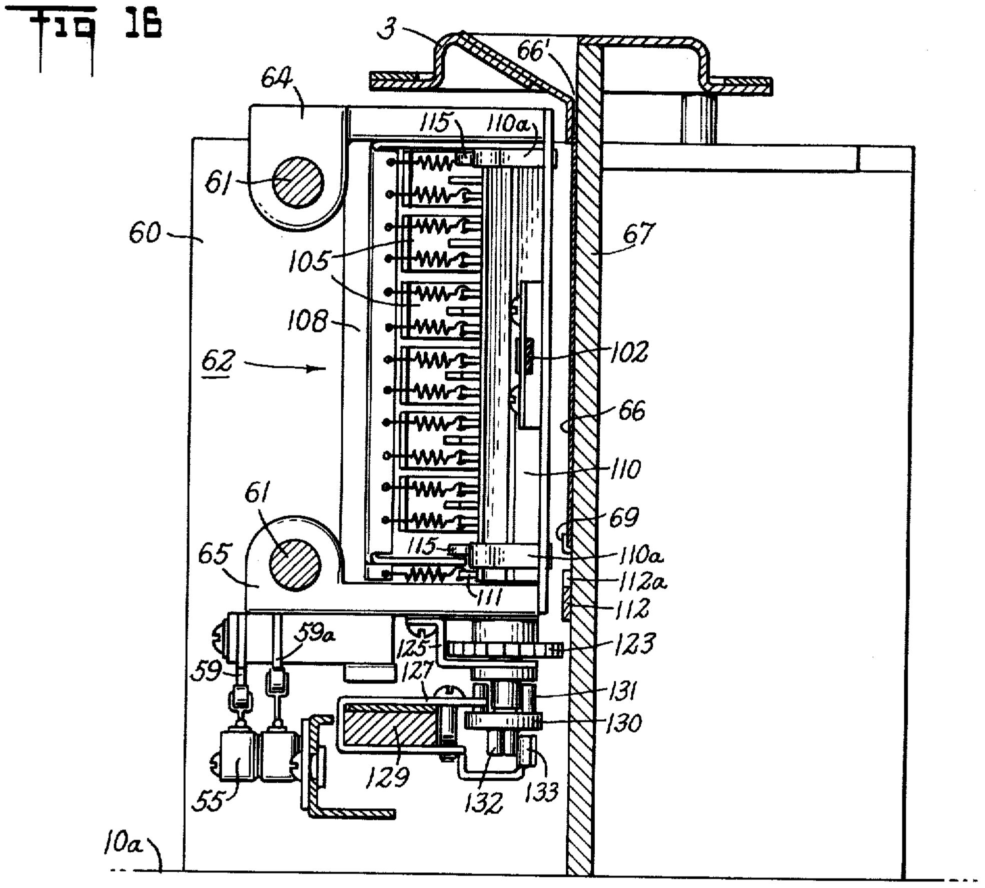
Figure 17:
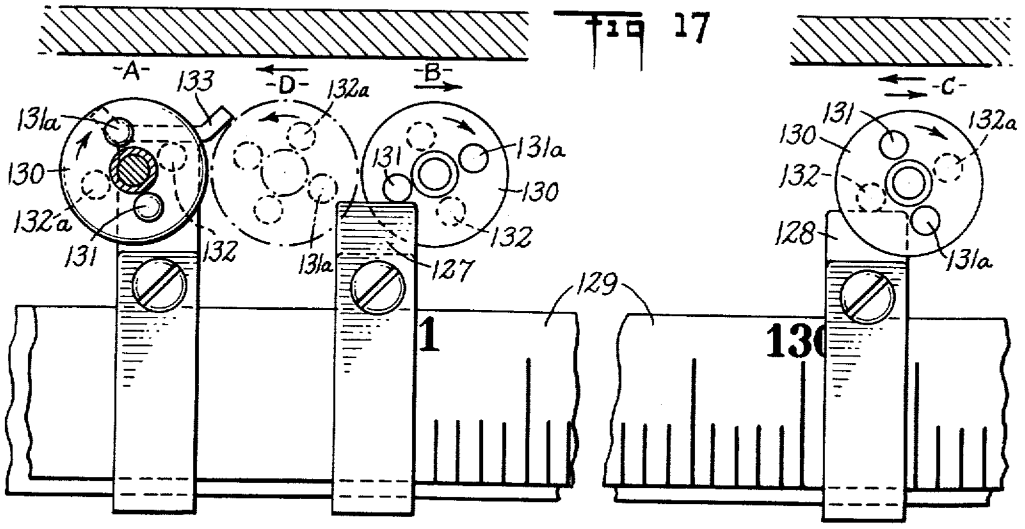
Figures 18, 18A, 18B, 18C:
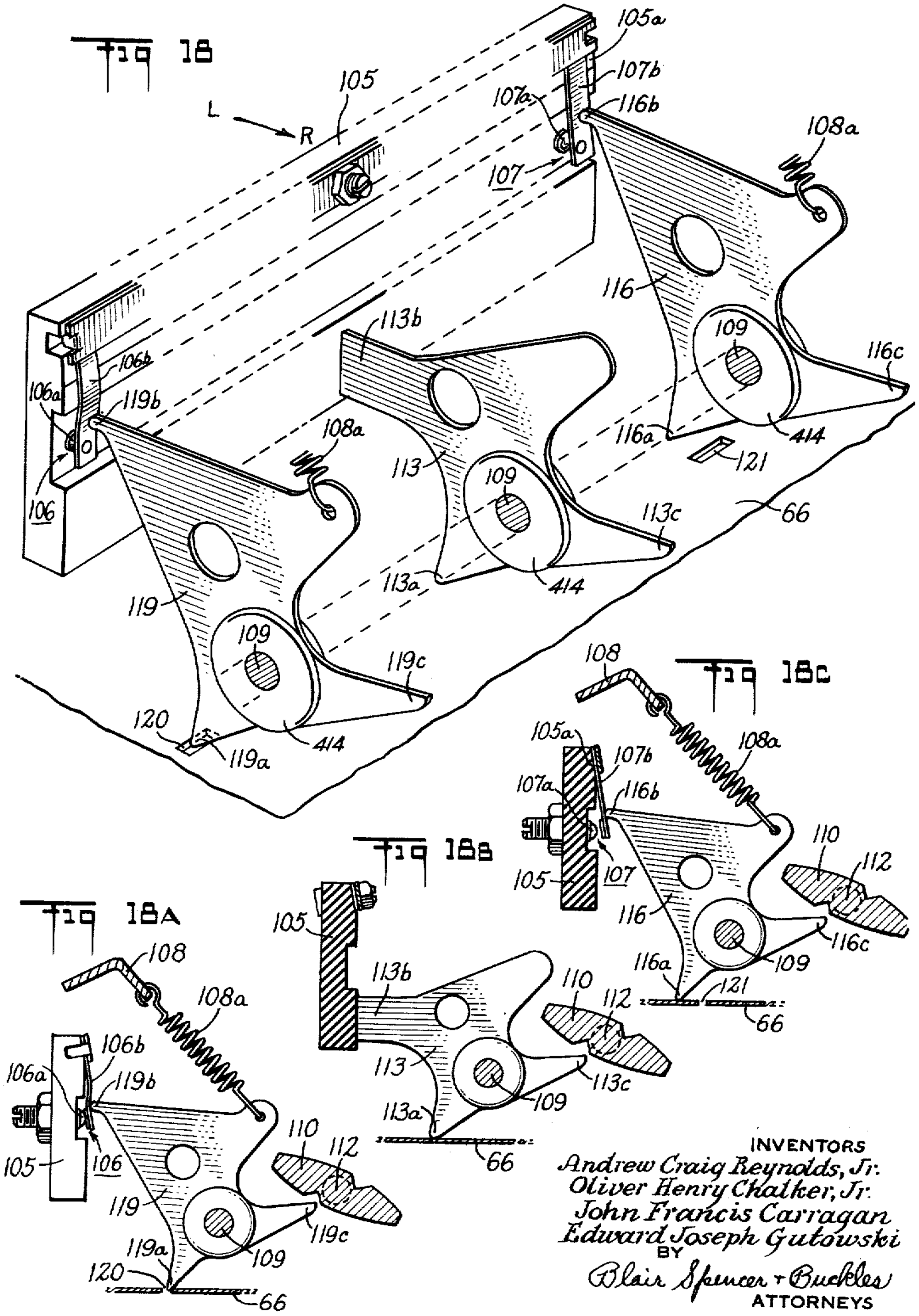
Figures 19, 19A:
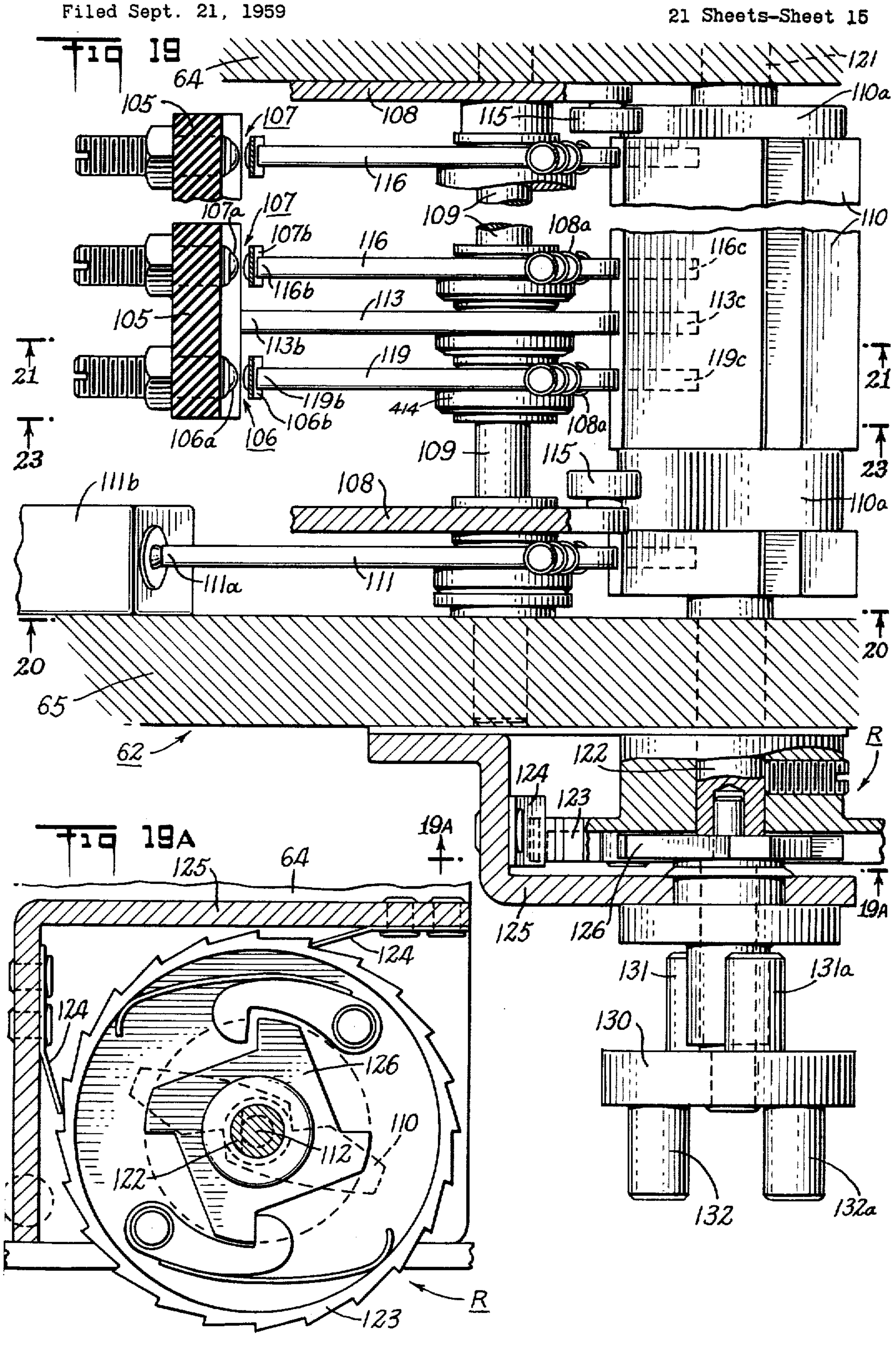
Figure 20:
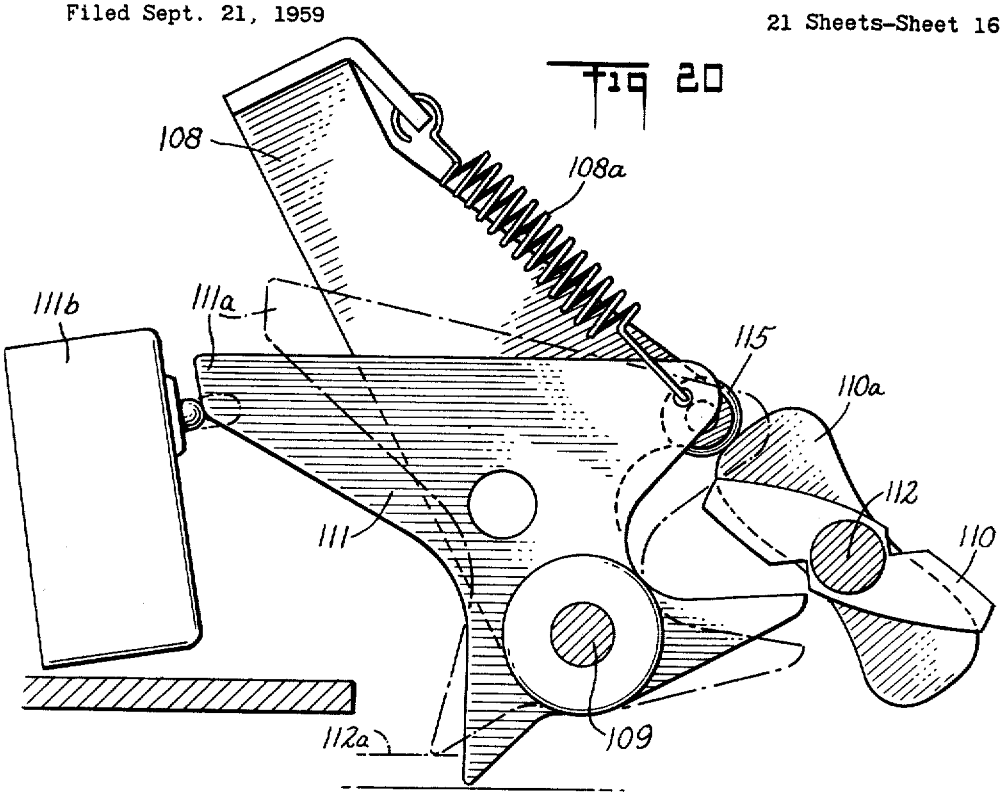
Figure 21:
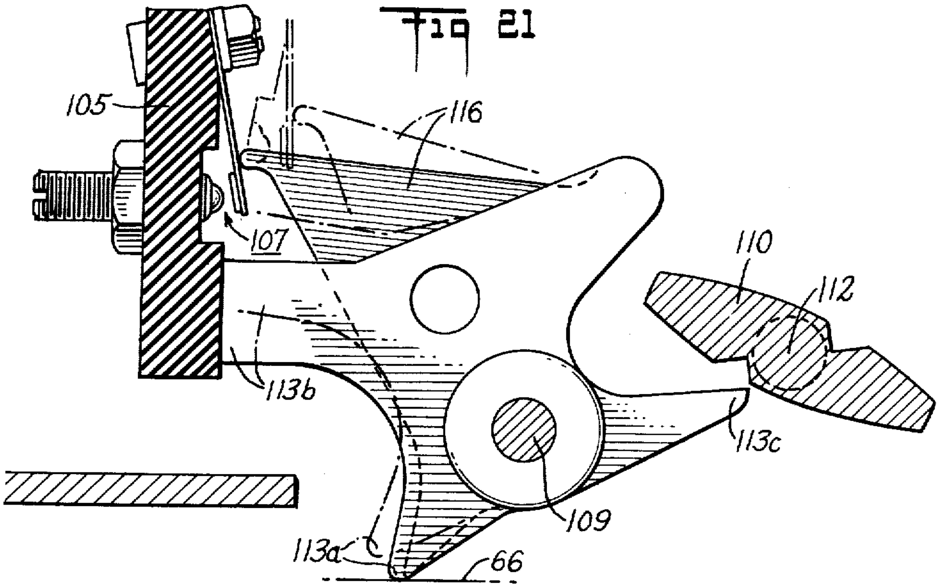
Figure 22:
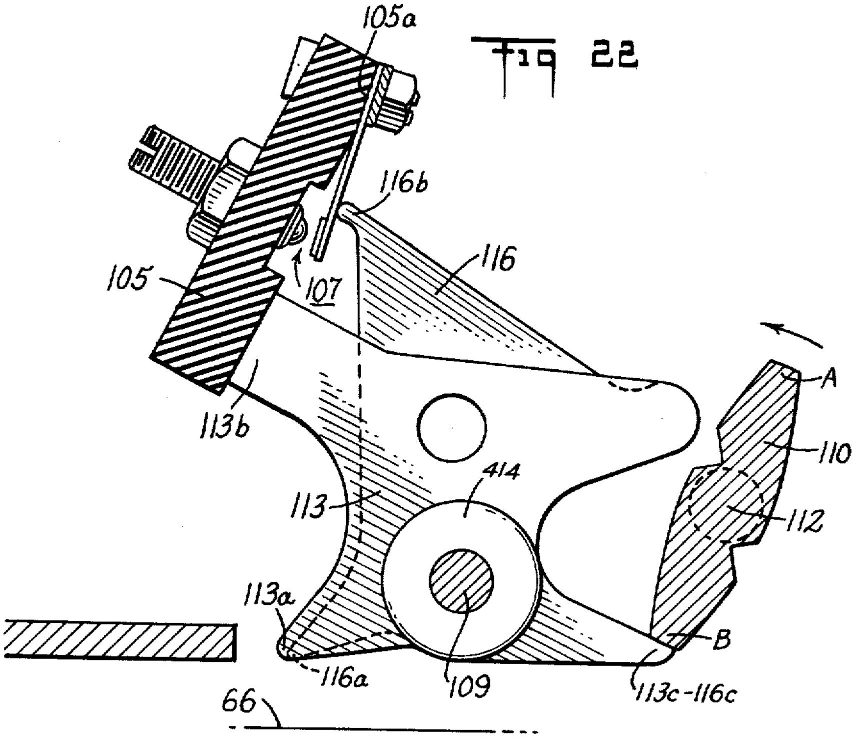
Figure 23:
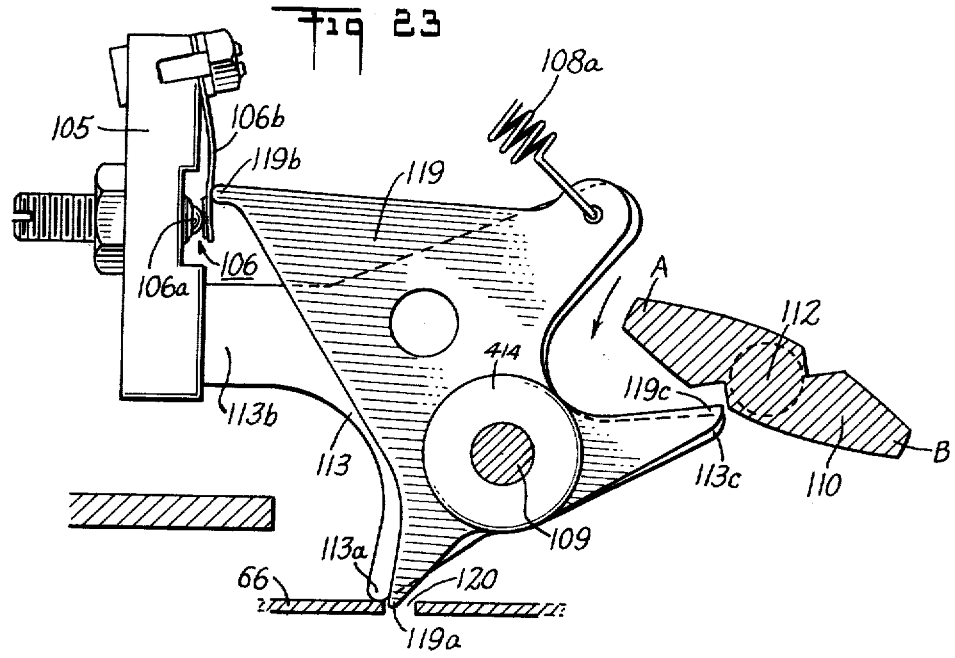
Figure 24:
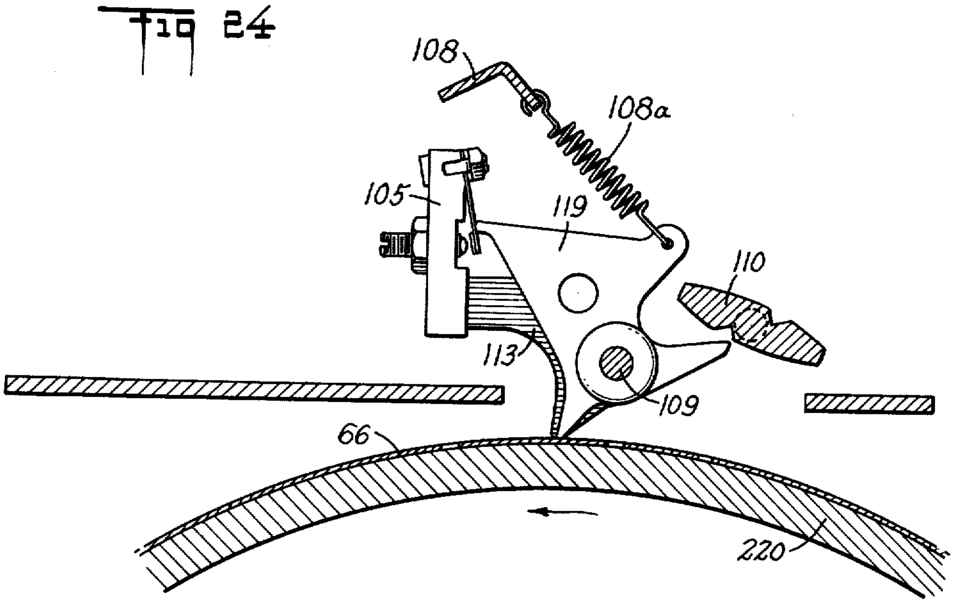
Figure 25:
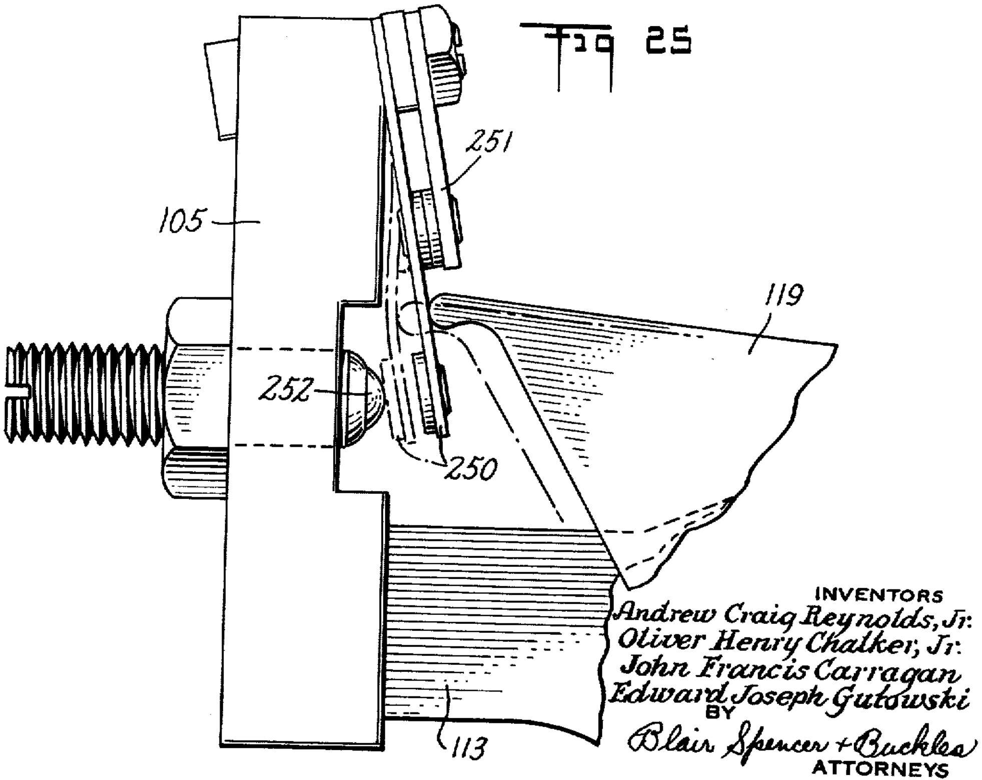
Figure 26:
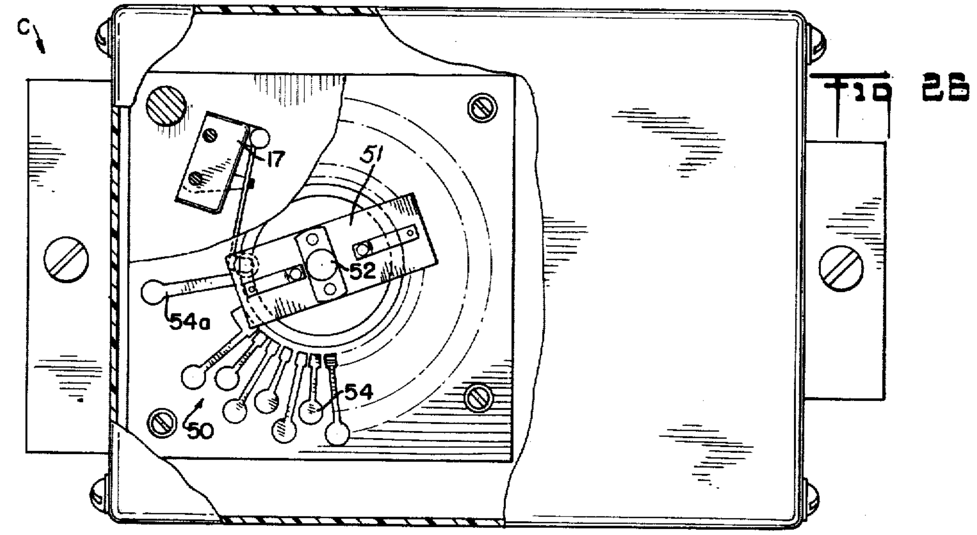
Figure 27:
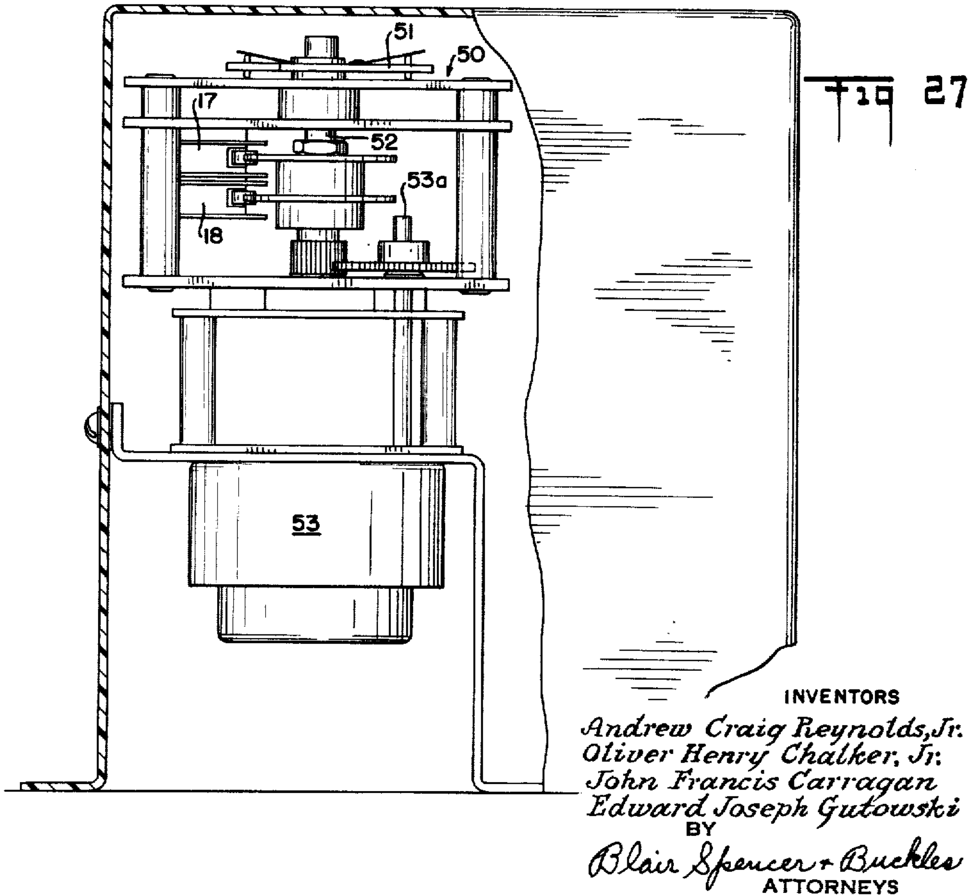

FIGURES 9A and 9B, taken together, are a vertical sectional view of the card handling mechanism of FIGURE 8, taken along the line 9A and B—9A and B of FIGURE 2, showing opposite ends of the card handling mechanism to an enlarged scale, approximately full size;

FIGURE 10 is a detail section taken along line 10—10 of FIGURE 2, showing a portion of the card locking mechanism;

FIGURE 11 is a detail view in section taken along line 11—11 of FIGURE 12, showing another portion of the card locking mechanism;

FIGURE 12 is a sectional view taken along line 12—12 of FIGURE 2, showing the card raising and lowering mechanism with the cards in raised position;

FIGURE 13 is a similar sectional view taken along line 13—13 of FIGURE 14 with the cards in their lowered position;

FIGURE 14 is a vertical sectional view taken along line 14—14 of FIGURE 9A, showing a portion of the card locking mechanism and a portion of the card reading head to an enlarged scale;

FIGURE 15 is a sectional view on the same plane as FIGURE 14, showing further portions of the reading head similarly enlarged;

FIGURE 16 is a substantially full scale vertical sectional view of the card reading head of FIGURE 14 and FIGURE 15, taken on the same plane, and showing its installation in the card handling apparatus and the relation thereof to the read-head cam control mechanism;

FIGURE 17 is a functional detail plan view of a portion of the card handling apparatus, showing the read-head cam control mechanism in four successive positions as the read-head normally moves from left to right and returns again to its extreme left or "home" position;

FIGURE 18 is an exploded perspective view of a portion of the card reading mechanism, showing one sensing unit comprising a pair of sensing fingers, and their associated electrical contacts mounted on their common insulating block supported by a central reference finger;

FIGURES 18A, 18B, and 18C are corresponding vertical sectional views of the sensing mechanism in FIGURE 18, showing, respectively, (A) the front sensing finger displaced in a punched card hole with its associated contact closed, (B) the center reference finger riding on the unperforated surface of a data card and supporting the insulated contact block, and (C) the back sensing finger also engaging an imperforated portion of the data card with its associated contact open;

FIGURE 19 is a partial sectional view of the read-head cam control mechanism, greatly enlarged;

FIGURE 19A is a sectional plan view of the unidirectional drive for the read-head cam control taken along the line 19a—19a of FIGURE 19;

FIGURE 20 is a partial sectional view, taken along the line 20—20 of FIGURE 19, showing the gating control member in two positions, the normal operating position being shown in solid lines and the open position in broken lines;

FIGURE 21 is a sectional view similar to FIGURE 20, taken along the line 21—21 in FIGURE 19, showing a reference finger and one of its associated sensing fingers and electrical contacts in two positions, corresponding to their relative positions when engaging record cards of different thicknesses;

FIGURE 22 is a sectional view in the same plane as FIGURE 21, but showing the butterfly cam operated to disengage the read-head from the sensing position;

FIGURE 23 is a sectional view similar to FIGURES 21 and 22, but taken along the line 23—23 of FIGURE 19, to illustrate a sensing finger displaced within a data record hole of a punched card, the associated electrical contact closed, and the contact-carrying reference finger riding upon an imperforated portion of the data record card;

FIGURE 24 is a sectional view of the read-head sensing elements of the invention in engagement with a curved record surface, as may be employed with a cylindrical drum record;

FIGURE 25 is an enlarged sectional view of an alternative form of sensing contact structure illustrating a back contact normally closed, as shown by the solid lines, and open in the forward position, as shown by the broken lines;

FIGURE 26 is a plan view of the variable information "read-out" mechanism;

FIGURE 27 is a side elevation of the mechanism shown in FIGURE 26; and

Figure 28:
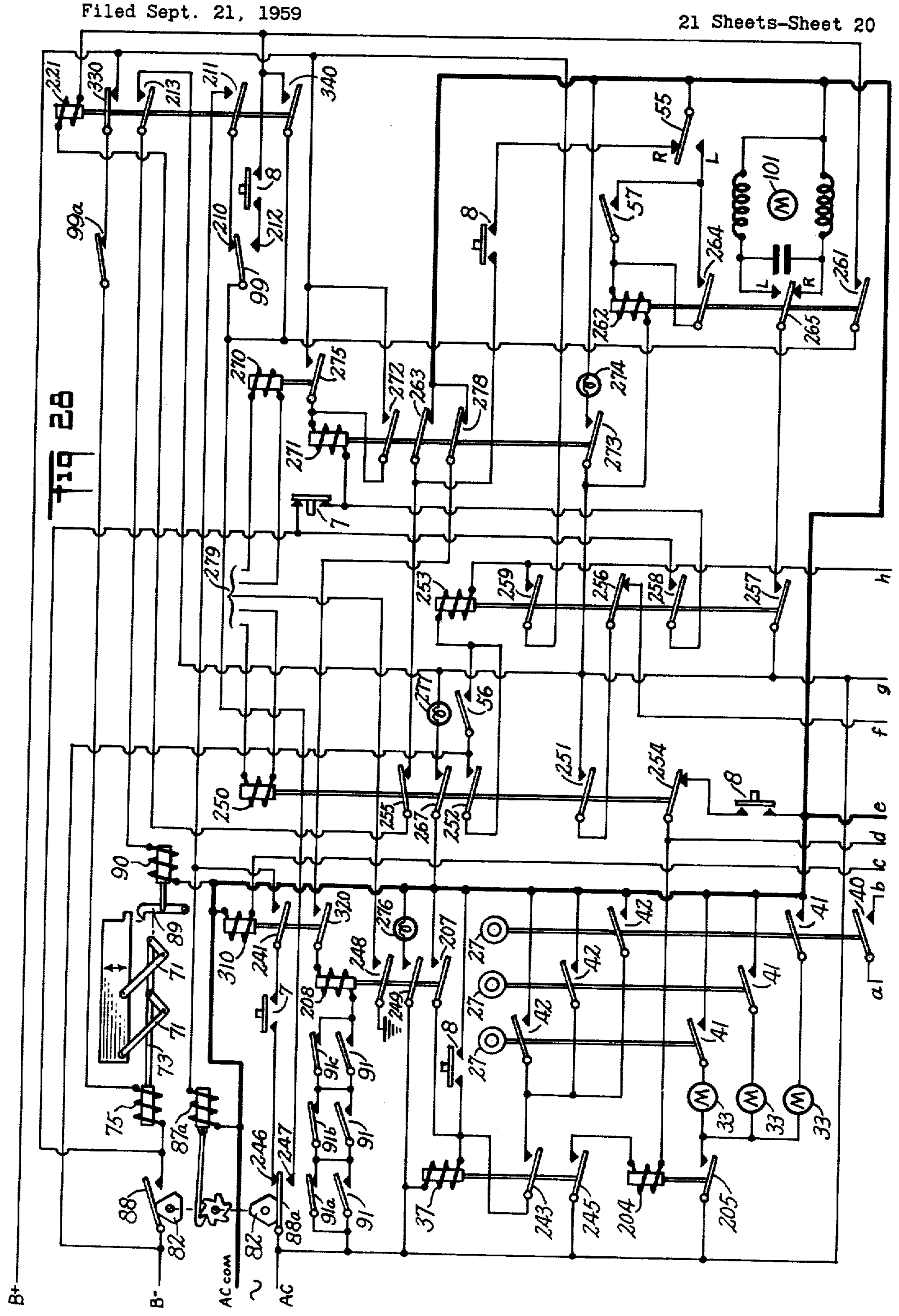
Figure 29:
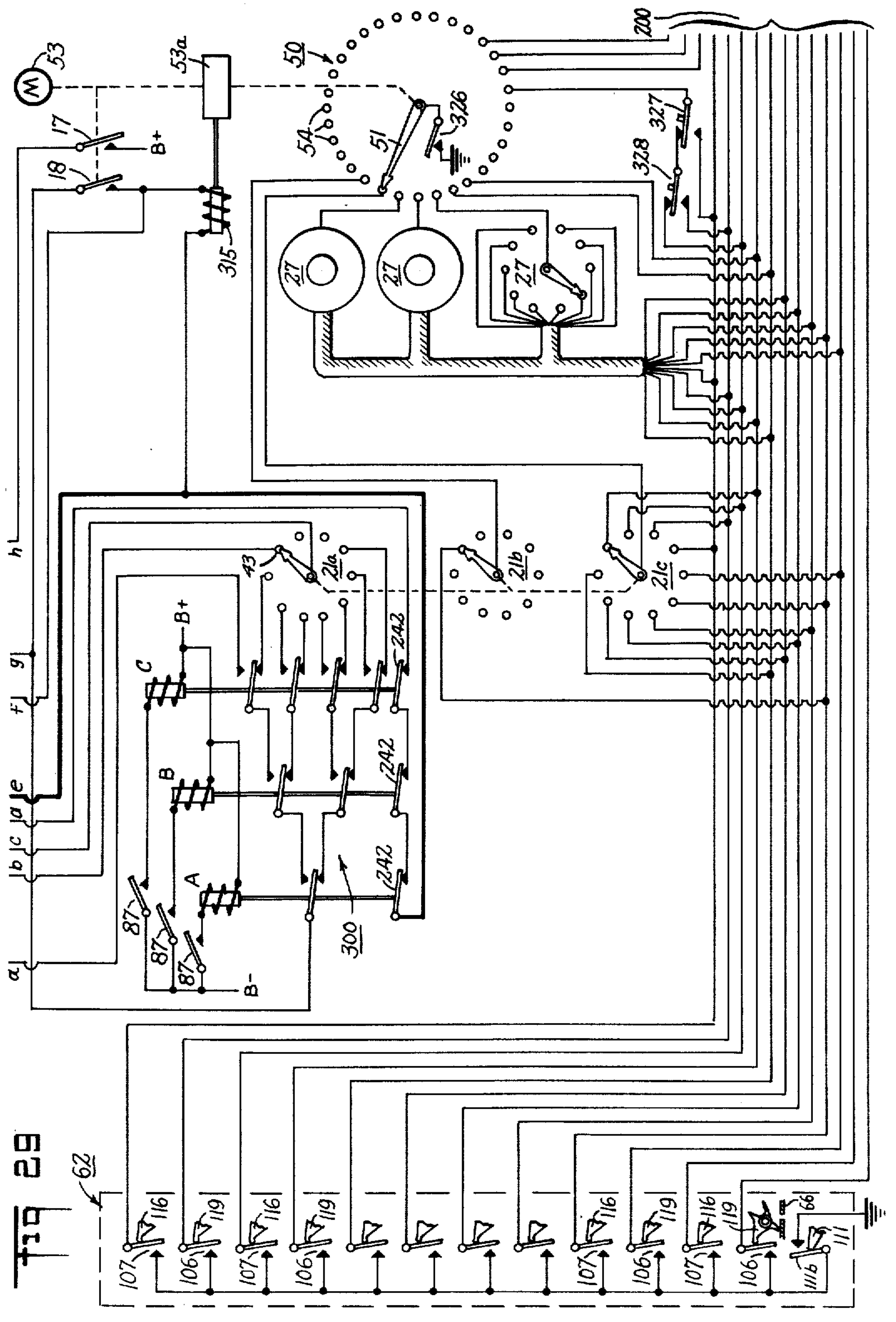

FIGURES 28 and 29 taken together comprise a schematic circuit diagram illustrating the electrical connections between the various portions of the apparatus of the invention, including automatic error prevention interlocks therebetween and connections extending from the data tarnsmitter of the invention to a remote receiver (not shown).

Figure 1:
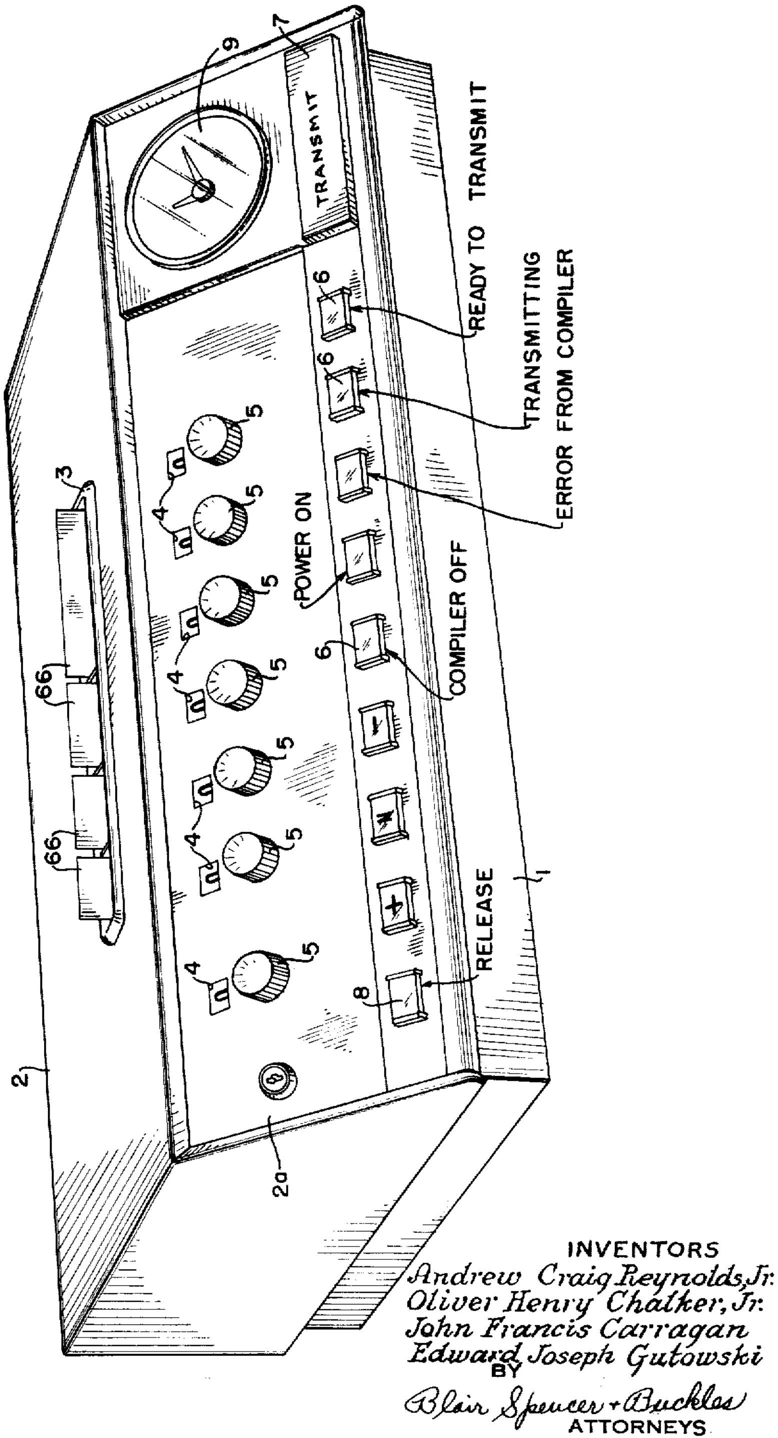
FIGURE 1 is an external perspective view of the complete transmitter data transmission apparatus.

Referring now in greater detail to the drawings, the structural relationships of the various parts, and the cooperation thereof in the complete assembly will be described. As shown in FIGURE 1, the entire transmitter mechanism is mounted on a base 1, to be supported on a suitable stand, and is provided with a cover 2 which can be lifted off as a unit to give access to the entire mechanism. Supported in the top wall of the cover is a guide 3 for positioning the cards in their proper places in the card locking mechanism. The cover is also formed with a row of openings 4 through which may be seen the uppermost numerals on a series of dials, which are adjsuted by the knobs 5 of the so-called "variable information" mechanism. The knobs 5 project through holes in a sloping front panel 2a which is secured to the base 1. At the lower edge of the front panel 2a there is a row of openings covered by windows 6, through which are visible a number of signal lights, showing certain conditions of the operation as indicated by the legends appearing in FIGURE 1. To the right of the windows 6 is the "transmit" bar 7, and to the left thereof are a "release" key 8 and three keys marked "+," "N," and "—," whose function will be explained hereinafter. Above the transmit bar 7 is a clock 9 which is preferably of the type disclosed in U.S. Patent No. 1,280,171, dated October 1, 1918, and is controlled by a master clock located in the Compiler at a central office.

FIGURE 2 shows the arrangement of the several units making up the complete transmitter machine. The variable information unit is designated as a whole by reference character A. This unit comprises a separate frame 10 which is attached as a unit to the base 1 of the machine. The card handling and reading head mechanism constitutes a second unit B, which is likewise supported in its entirety on a separate frame 10a. This frame is positioned on the base member 1 by means of sleeves 11 and pins 12 (see FIGURE 10). The variable information readout is indicated generally at C, and this unit is also independently mounted on the base so as to be removable as a unit. The direct current power supply unit D is similarly independently supported on the base, and all the relays and other circuit control instrumentalities for the data transmitting circuits and the control circuits of the apparatus are supported on a vertical panel E attached to the base 1 and provided with handles 13 for convenient removal.

There is also attached to the base, as indicated at F in FIGURE 2, a plug board program setup unit to facilitate the setting of the machine for handling various types of transactions. These various units will be separately described in the following specification.

*The Variable Information Section*

The variable information section is shown in FIGURES 3–7. In the machine selected for illustration there are six variable information dial assemblies 20, which are identical in their construction and operation except that the assembly at the left of the row includes an extra switch which will be later described. Also included in the row with the variable information dial assembly is a dial assembly 21 which controls other steps in the overall operation of the device, as will also be later described.

Figure 3:
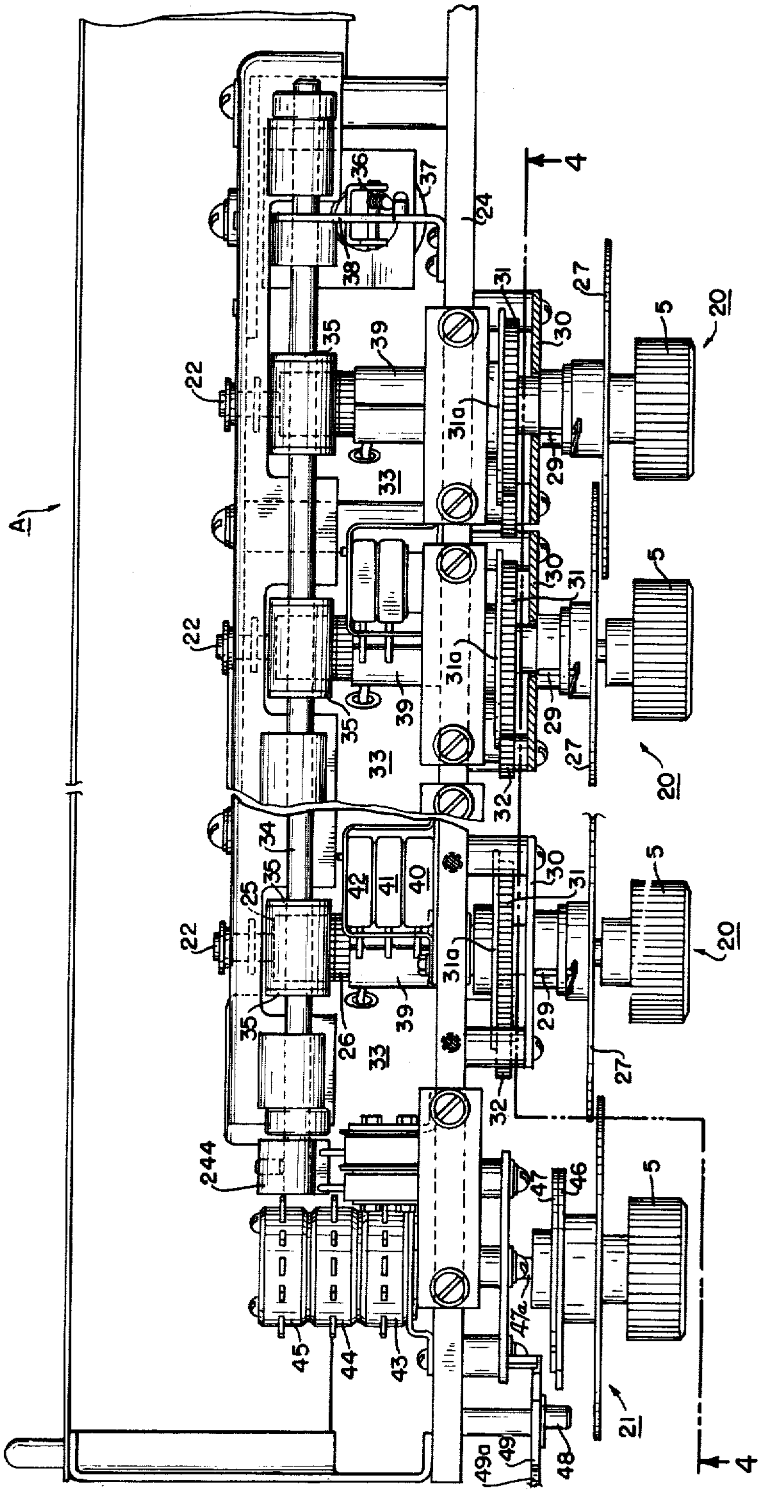
FIGURE 3 is a plan view of the manually operable variable information input section of the apparatus on a larger scale than FIGURE 2, the view being on a plane parallel with the axes of the variable dial knobs.
Figure 4:
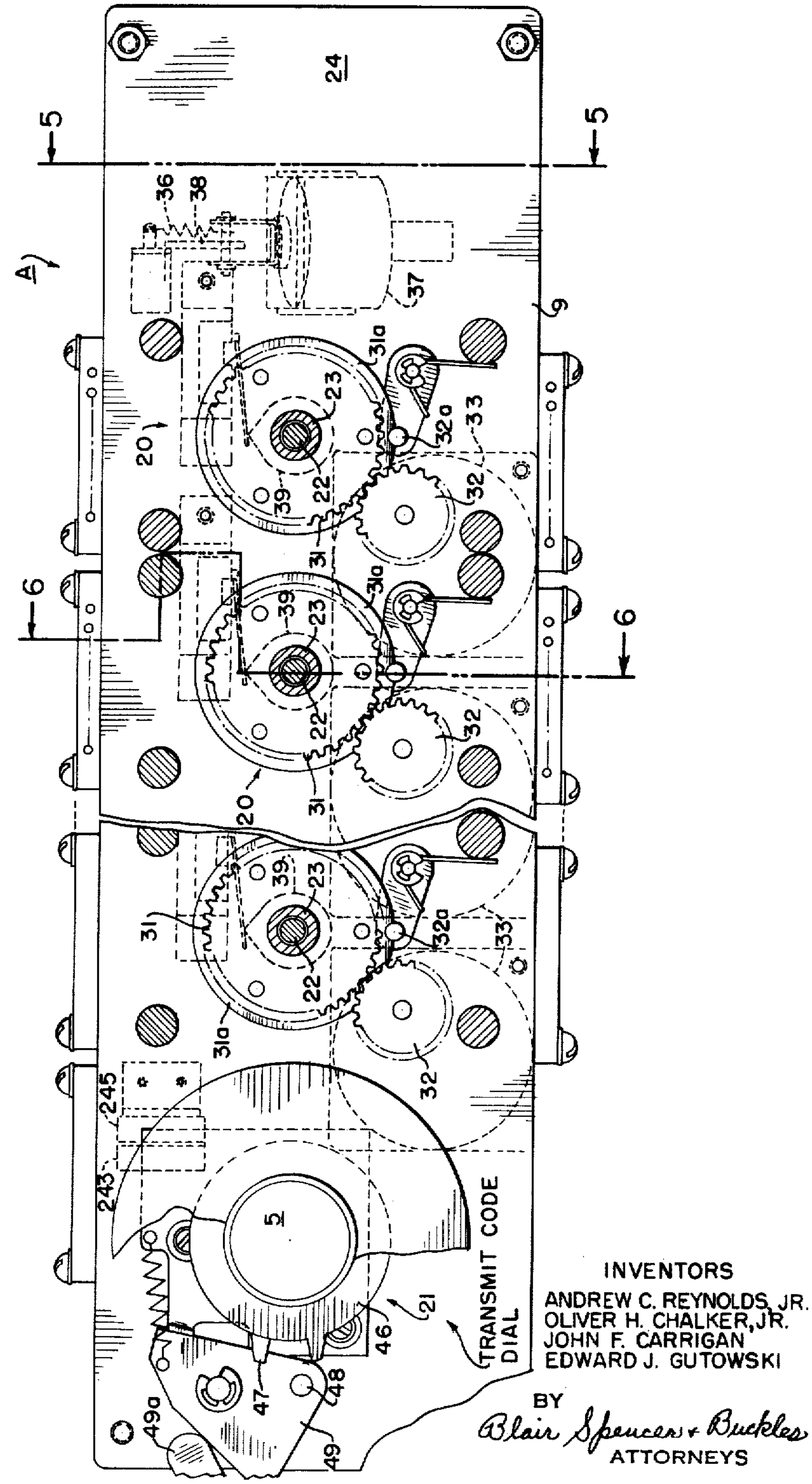
FIGURE 4 is a vertical section of the variable information input controls, taken on line 4—4 of FIGURE 3.
Figures 5, 6, 7:
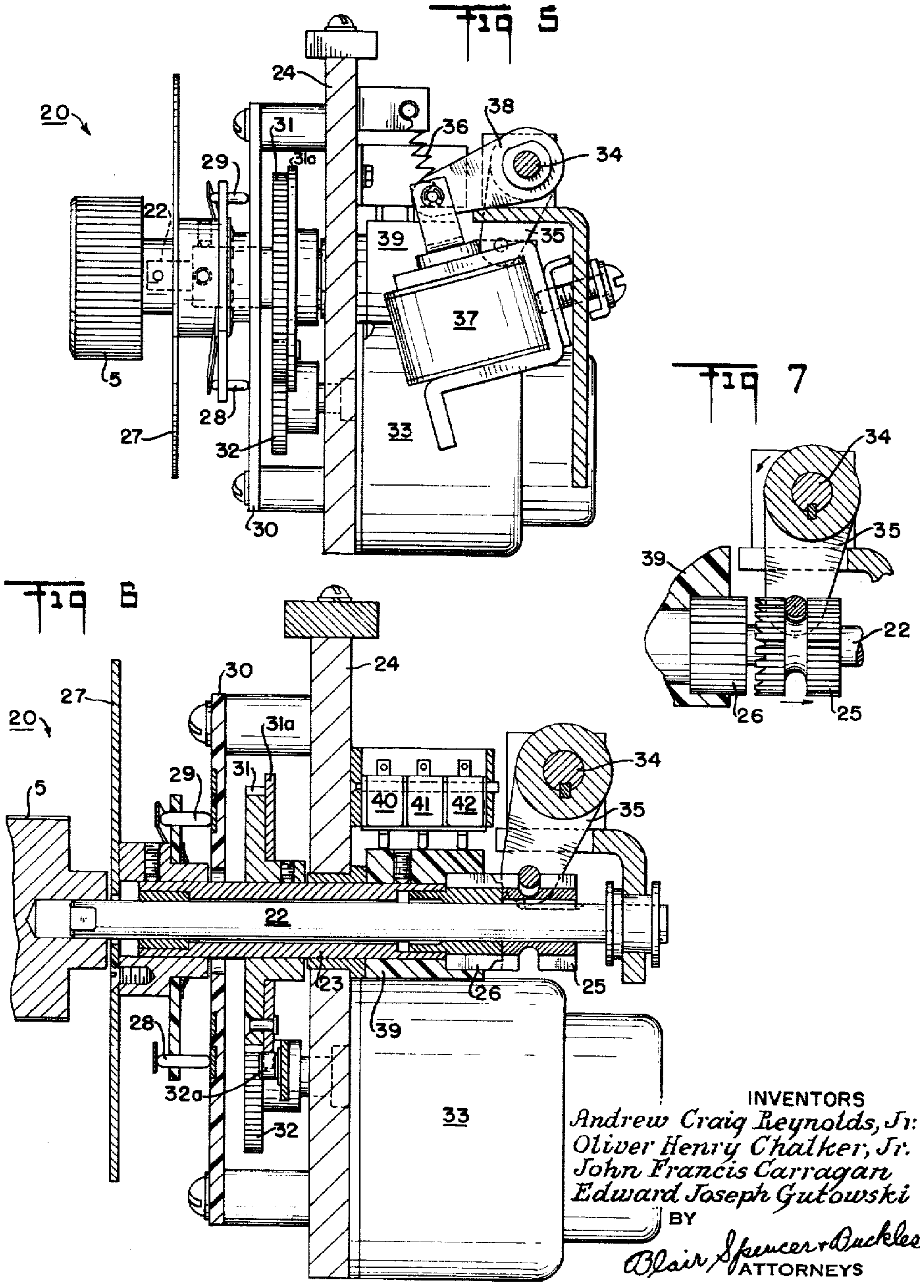
FIGURE 5 is a detail view of the manual input control, taken in section along line 5—5 of FIGURE 4.
FIGURE 6 is a detail view in section on line 6—6 of FIGURE 4, showing one of the clutches for the variable information knobs.
FIGURE 7 is a similar view of a portion of FIGURE 6 showing the clutch disengaged.

Referring now to FIGURES 4 and 6, each variable information dial assembly consists of a shaft 22 to which the knob 5 is attached. The shaft 22 is supported in a sleeve 23, which in turn is mounted in a bearing carried by the vertical panel 24 forming part of the frame for the variable information section. The shaft 22 is rotatably mounted in the sleeve 23 and has slidably attached to it a clutch member 25 which, when moved outwardly, that is to the left as shown in FIGURE 7, engages a clutch member 26 attached to the end of the sleeve 23. Also attached to the sleeve 23 is a dial 27 having around the periphery of its face the digits 0–9 which are visible through the openings 4 in the cover 2. Attached to the back of the dial 27 are a pair of contacts 28, 29 which are in sliding engagement with contacts of a printed circuit member 30 attached to the face of the panel 24. Also attached to the sleeve 23 is a gear 31 meshing with a pinion 32 on the shaft of an electric motor 33 by means of which the dial 27 is returned to zero position at the conclusion of the transmission cycle. Attached to the back of each gear 31 is a disk 31a (see FIGURE 3) which has a single notch in its periphery positioned to engage a spring-biased pin 32a when the dial 27 is in its zero position.

Each dial assembly includes its own motor, but all the clutches 25—26 are simultaneously opened and closed through a common operating shaft 34 to which are attached rock arms 35 for the clutch members 25. The shaft 34 is normally held by a spring 36 (see FIGURE 5) in the position in which the clutches are closed, and all the clutches are opened by means of a solenoid 37 whose core is attached to a rocker arm 38 at the end of the shaft 34. FIGURE 7 shows the clutch members 25—26 in their disengaged position, the solenoid 37 having been energized. Also attached to the sleeve 23 of each dial assembly is a cam 39 as shown in FIGURE 3, so shaped as to close certain spring-biased switches attached to the panel 24 overlying the cam whenever the dial is turned from its zero position. FIGURE 6 shows the dial assembly at the left of the row of "variable information" dials. In this assembly there are three switches 40, 41, and 42. Switch 40 is employed in connection with this one dial only. This switch is in a circuit not directly involved in the functioning of the variable data section, and its connections will be later described.

Corresponding switches 41, in connection with each of the variable information dials 27, are in circuit with the motors 33 and serve to connect the motors of all the dials which have been adjusted from zero position with the power source so that, when a common circuit to all the motors is closed at the conclusion of the transmitting cycle, all the dials which have been moved will be returned to their zero positions. Switches 42 at each dial are connected in parallel between the source of power and the solenoid 37 which opens the clutches between the knobs 5 and the sleeves carrying the variable information contacts. When this circuit is completed through a switch in the "ready to transmit" circuit, the clutches will be opened and will not be closed until all the dials have been returned to zero position.

As stated above, all the dials 27, when the machine is idle, are connected to their respective knobs 5 so that the operator, on turning the knob, shifts the contacts 28 and 29 from the zero position to the proper position for the data to be recorded. At each position, as indicated by the digit appearing in the opening 4, a different circuit to the Compiler is set up, and the circuits of the several dials are successively energized by variable information readout devices shown in FIGURES 26 and 27. The readout mechanism comprises, as shown in FIGURE 26, a printed circuit 50, which contains a contact 54 for each dial and a common return contact 54*a* connected to a conductor to the Compiler. The printed circuit 50 contains a number of contacts in addition to those connected to the several variable information dials, and these contacts may be selectively connected to additional circuits to the Compiler to be successively energized during the operation of the variable information readout device. The sweep 51 which engages the contacts 54 of circuit 50 and the return contact 54*a* are carried by a rotating shaft 52 which is given one complete revolution by motor 53 for each transmitting cycle. Two switches indicated at 17 and 18 in FIGURE 27 are positioned adjacent the shaft 52 and are held open when the shaft is in its stationary position and are closed until just prior to the conclusion of the complete revolution of the shaft. The circuits of these switches are shown in FIGURES 28 and 29 and will be later described.

Referring again to FIG. 3 of the drawings, the knob 5 of code dial assembly 21 is attached to the dial shaft 47*a* and the shaft remains in the position to which it is adjusted until manually returned to zero position. Attached to the shaft 47*a* are three contacts, not shown, which engage respectively the fixed contacts of three housings 43, 44 and 45 surrounding the end of the shaft within the casing. Each of the housings may have ten or more fixed contacts the conductors from which may be differently connected in the plug-board assembly F (FIG. 2) in accordance with the particular type of transaction for which the transmitter is set up. The code dial assembly may be provided with a key lock attachment, see FIG. 3, consisting of a disk 46 attached to the shaft and a second disk 47 rotatably adjustable on the shaft. Each of the disks has a radial projection in the path of a pin 48 on a rocker 49 when the rocker is turned by a key operated lever 49*a*. By this arrangement the dial may be locked in one position or allowed a limited movement if the system is set up to selectively compile two or more different transactions. The disengagement of the dial clutches 25—26 during transmission prevents the introduction of errors in variable information through inadvertent turning of the dials by the operator before a transaction transmission is completed.

*The Card Handling Mechanism*

FIG. 8 discloses in a perspective view a complete card handling and read-head apparatus, here removed as a unit from the transaction transmitter of the invention. FIGS. 9*a* and 9*b* taken together disclose in greater detail a front elevation view of a complete card handling apparatus similar to that of FIG. 8, substantially to full scale. The mechanisms of FIG. 8 and FIGS. 9*a* and 9*b* comprise the card guide unit 3, mounted on the top of the frame 60—60 of this unit, and which projects above the cover 2 (FIGURE 1) when the cover is in place. The card guide 3 is initially designed and selected for the number and width of punched cards which its transmitter is intended to accommodate. The size and shape of these cards may be varied, depending upon the type of transaction for which the installation is adapted. In the embodiment illustrated by FIGURE 8, the apparatus is adapted to receive three punched cards in slots 66′—66′—66′, the first being for a standard business machine card of 80 vertical columns comprising 12 horizontal rows, while the remaining two slots are adapted to receive narrower cards containing fewer columns of punched information. As mentioned above, these cards may be of different materials, such as, for example, paper, plastic, or metal, and of differing thicknesses. In the detailed elevation drawings of FIG. 9*a* and FIG. 9*b*, the card handling unit disclosed is adapted to accommodate four cards of varying widths, including one card of 44 columns, one card of 29, one card of 22 and one card of 15 columns. The frame of the card handling unit of FIGS. 9*a* and 9*b* comprises a base member 10*a* which rests on the base 1 of the machine and is held in place by the sleeve and pin engagement previously described in reference to FIG. 2. Vertical frame members 60—60 at opposite ends are connected by two substantially cylindrical horizontally extending rails 61 on which the read-head 62 is supported for transverse movement by ball bearing bushings in the top and bottom castings 64 and 65. Also attached to the base member 10*a* of this unit is a vertical plate 67 (see FIG. 16) which forms a plane backing member for vertical support of the cards during the transmitting cycle while the cards are retained in operating position by the card lowering and clamping mechanism which will now be described with reference to FIGURES 9A and 9B through FIGURE 14.

The machine is set up at the factory before delivery with the card guide 3 and vertical plate 67 of the proper design for the number and width of cards to be handled by the machine. That is to say, the plate 67 is formed with vertical slots 67*a* for guiding the card raising and lowering mechanism, the slots being spaced to lie between the edges of the several cards which are to be simultaneously read in the operation of the machine. Mounted for vertical movement in each of the slots is a slide such as 68, which slides are connected across their bottom ends by a card-supporting angle 69 which in the elevated position of the slides is a short distance below the plane of the cover 2 so that when the cards are inserted in the guide 3 with their bottom edges resting on the angle 69, the top edges will project above the cover in the manner indicated in FIGURE 1.

The slides 68 are moved in unison by a bar 70 extending across the machine on the side of the vertical panel 67 away from the card read-head. The bar 70 is held in position in notches in the slides 68 so as to move the slides vertically with the bar while permitting relative horizontal movement of the bar with respect to the slides. The bar 70 is raised and lowered by means of two bell cranks 71 which have their long arms pivoted to the face of the bar 70 as shown in FIGURE 12. The short arms of the bell cranks are pivotally connected to a connecting rod 73 whose free end is attached at 74 to the crank pin of reciprocating solenoid 75. When the solenoid 75 is energized, its armature is rotated in a counterclockwise direction as shown in FIGURE 12, thereby shifting the connecting rod 73 to the right and turning the bell crank arms 71 in a clockwise direction to move the bar 70 downward and with it all the slides 68.

Before the downward movement of the card takes place, the cards are clamped against the edges of the slides 68 by fingers 76 attached to the front face of the slides 68 and projecting over the edges of the cards supported on the angle 69 and the underlying edges of the slides, as shown more particularly in FIGURE 9B and FIGURE 11.

The fingers 76 extend transversely across the face of the slide in slots formed in the face of the slide and are supported for movement toward and away from the slide by means of bolts 77 projecting through the slide and with their heads spaced from the back of the slide to provide space for a compression spring 78 which normally holds the fingers pressed against the slide. The fingers are moved away from the slide by pressure upon the heads of the bolts in a direction to compress the springs. The mechanism for shifting the fingers 76 away from the slide consists of a plate 79 engaging the heads of the bolts 77 and with a stem 80 projecting between the bolts and supported by a cross pin 81 whose ends are carried by slots in the adjacent portions of the slide. The movement of the plate 79 toward and away from the panel 67 is effected by a triangular cam 82 supported on a transverse shaft 83 mounted in fixed bearings in the frame of the card handling unit in a position for the cam to engage the plate when the slides are in their uppermost position, as indicated by the dotted line position of the rail 69 in FIGURE 14. When the machine is not operating and the card supporting rail is in the uppermost position, the cam 82 is in the position shown in FIGURE 11, to thereby hold the fingers 76 away from the slide so that the cards, when inserted in the card guide, will be free to move downwardly until their bottom edges rest on the rail or angle 69.

In order to insure that the cards are all properly positioned on the rail when inserted by the operator, a series of pivoted fingers 84 are suspended from a transverse shaft 85 adjacent the card receiving guide, the ends of the fingers being positioned to project through slots 86 in the panel 67 adjacent the slides 68. (See FIGURE 9B and FIGURE 14.) The ends of the fingers 84 project through the slots at a point opposite the rail 69 when the slides are in their elevated position and are so shaped that the fingers will be forced back to positions where their ends are flush with the face of the panel 67 only when the bottom edges of the cards are resting on the rail 69.

Adjacent the upper end of each finger 84 is a switch 87 which is normally open and is only closed by the finger 84 as it is pushed back by the card when the card is properly seated on the rail. All the switches 87 are connected as shown in FIGURE 29, and the conductors from the switches are connected to the circuit of the solenoid 87*a* (see FIGURE 10) which operates the ratchet mechanism 87*b* by means of which the shaft 83 is turned through 60 degrees from the position shown in FIGURE 11 to the position shown in FIGURE 14, to thereby release the plate 79 and permit the springs 78 to shift the fingers 76 and clamp the edges of the cards against the slides.

The rotation of the cam 82 also serves to close switch 88 in the circuit of the reciprocating solenoid 75 which shifts the bar 73 to lower the slides with the attached card supporting rail 69. When the switch 88 is closed, the solenoid 75 is operated, thereby pulling the bar 73 to the right and through the bell crank 71, moving the bar 70 downwardly with all the connecting slides to which the cards are gripped by the fingers 76. When the bar 73 is shifted its full stroke, it is locked in position by a latch 89 to which is connected the core of a solenoid 90. All the cards are thus held in their lowered positions until the transmission cycle has been completed and the read-head is ready to be returned to its initial position.

The downward movement of the cards also serves to close a series of switches 91 in the circuit of a relay which closes a switch in the "ready to transmit" circuit to the Compiler. These switches, as will be seen in FIGURE 14, are operated by pivoted levers 92 which are spring biased in the direction to close the respective switches by springs 93 when a latch mechanism 94 at the lower ends of the levers 92 is released by the lower edges of the cards contacting the trip arms 95 of the several latches. As will be seen in FIGURE 14, the trip arms 95 are pivoted on the shaft 96 and held in elevated position by springs 97. Notches 98 in the trip arms 95 are engaged by lugs on the lower ends of the arms 92 when the arms are swung forward at their lower ends to open the switches 91. The movement of the arms in a direction to open the switches 91 is effected on the upward movement of the carriage by means of pads 100 attached to the bar 70 as shown more particularly in FIGURE 12 and FIGURE 13. Also closed at the end of the downward movement of the card carriage are switches 99 and 99*a* in the circuits controlling the solenoids 75 and 87*a*. By means of the structure above described, all the cards must be properly positioned in their respective places by the operator before the clamping fingers will be released to clamp the cards to the vertically-moving carriage, and all the cards must be brought to their proper positions by the downward movement of the carriage in order for the read-head to be operated to transmit the data on the cards to the Compiler. Thus the proper insertion of cards by the operator is assured, and no errors of transmission can arise due to failure of the cards to be fully and completely seated in their proper transmitting positions. The arrangement of the various sized card slots 66, and the sequential passage of the card read-head thereover in a constant unitary direction provides foolproof initial selection and sorting of the card input data.

*The Read-Head*

As disclosed in the preferred embodiment, the read-head comprises a horizontally moveable carriage, indicated generally at 62 in FIG. 2 and FIG. 8, mounted for movement transversely across the faces of inserted cards 66, being guided in this motion by parallel rails 61—61. It is to be understood however that the card sensing mechanism of the invention is not limited to this specific combination, but that the invention contemplates also the condition in which the read-head may remain stationary and the data cards may be moved thereover, as for example by conventional card handling apparatus.

In the preferred embodiment disclosed by the drawings, the read-head 62 is moved across the cards from left to right, as shown in FIGURES 9*a* and 9*b*, by operation of a reversible motor 101 which is connected to the read-head through an endless belt 102. The belt 102 is preferably provided with ribs to engage corresponding teeth on the pulleys 103 so as to provide a positive drive for the read-head. The driving pulley 103, at the end of the machine adjacent to the driving motor 101, is preferably connected to motor 101 through a slip clutch 104 as shown in FIG. 9*a* to protect the machine against damage in the event movement of the read-head should inadvertently be restrained or otherwise interfered with. The direction of operation of reversible motor 101 is controlled by switches, such as 55 and 57, adjustably positioned adjacent the path of movement of the read-head. The read-head carries a plurality of card surface sensing members, one for each horizontal row of perforations or surface indentations in the cards from which the data are transmitted in the operation of the machine. In the apparatus of the preferred embodiment there are provided 12 horizontal rows of sensing members 116 (as shown in FIG. 15), each adapted to operate an associated electrical switch contact indicated generally as 106. Each pair of electrical contacts 106 is mounted on a separate insulating block 105 which is carried by a reference member or finger 113.

The operation of the unique card sensing members of the invention may be more readily understood by reference to FIG. 18 which is an enlarged and exploded perspective view of one pair of data sensing fingers, with their associated electrical contacts and common reference finger on which the electrical contact carrying block 105 is mounted. As shown in FIG. 18 three surface sensing members 113, 116 and 119 are all mounted for pivotal rotation about a common shaft 109. The members 113, 116 and 119 are preferably formed of a light weight sheet metal such as aluminum and are each provided with a bearing bushing 414, which may be of brass, whereby each member is capable of independent rotary motion about common shaft 109. The central member 113 operates as a surface reference guide as it engages the unperforated portion of a data card 66 and thereby automatically adjusts the position of contact block 105 for different card thicknesses and other surface variations. As shown in FIG. 18 the insulated contact carrying block 105 is affixed to the arm 113*b* of reference member 113 whereby the contact carrying block 105 is also adapted to rotate with reference arm 113 about the axis of shaft 109.

The electrical contacts indicated generally at 106 and 107 in FIG. 18 comprise, respectively, fixed contact member 106*a* with its associated flexible spring contact 106*b*, and fixed contact 107*a* with flexible spring contact 107*b*. The flexible spring members 106*b* and 107*b* are mounted on a beveled edge portion 105*a* of insulating block 105 whereby the spring members 106*b* and 107*b* are normally disengaged from fixed contacts 106*a* and 107*a*, as shown more clearly in FIG. 18*c*, but are conductively engageable therewith when operated upon by a sensing member such as 119, as shown in FIG. 18 and in FIG. 18*a*. FIGURES 18*a*, 18*b* and 18*c* show side elevation views of the three members 119, 113 and 116, respectively, in their operative relationship to the surface of a data card 66 wherein the sensing finger portion 119*a* of member 119 has entered a perforated recess or aperture 120 in card 66 while the sensing finger portions 113*a* of member 113 and 116*a* of member 116 remain in engagement with the unperforated surface of card 66. The sensing members 116 and 119 are biased toward counterclockwise rotation about the axis of common shaft 109 through the influence of coil springs 108*a* which are affixed to a moveable bail 108 (FIGS. 18*a* and 18*c*) which will be described more fully hereinafter with reference to FIG. 20 of the drawings.

With relative motion from left to right between the sensing members and the surface of the card (as illustrated by the arrow L—R in FIG. 18), the finger portion 119*a* of member 119 has dropped into aperture 120, thereby allowing rotation of member 119 in a counterclockwise direction until the extremity 119*b* has closed spring contact member 106*b* into conductive engagement with its associated fixed contact 106*a*. Finger portion 116*a* of sensing member 116 has not yet encountered aperture 121 and consequently no force is brought to bear by extremity 116*b* onto its associated spring contact member 107*b* and so the associated electrical circuit at 107 remains open.

Because no perforations are provided in the path of reference finger portion 113*a* of reference member 113, the reference portion 113*a* rides continuously on the surface of card 66 and its only vertical movements, resulting in pivotal motion of reference member 113 about shaft 109, are those that may be caused by variation in thickness of the card 66, or minor surface variations such as may be caused by foreign matter or wrinkles in the card 66. Any such variations in the thickness or surface characteristics of cards 66 result in a corresponding vertical motion of the contact carrying insulated block 105, so that the relative displacement necessary at sensing finger portions 116*a* and 119*a* to effect corresponding closure of their associated contacts 106 and 107 remains constant at all times. The relative displacements of the members 119, 113 and 116 as shown in perspective by FIG. 18 are more clearly illustrated by the corresponding horizontal elevational views of each member shown in FIGURES 18*a*, 18*b* and 18*c* respectively.

As the sensing members shown in FIG. 18 move from left to right over the surface of the card 66, or as the card moves from right to left under the sensing fingers, sensing finger portion 119*a* of member 119 will subsequently ride up upon the surface of card 66 out of the depression of aperture 120 and open contact 106, while sensing finger portion 116*a* of member 116 will subsequently drop into aperture 121 thereby closing associated contact 107. In this manner the presence or absence of perforations or other surface indentations in a data card is detected by relative motion between the electro-mechanical sensing means of the invention and the surface of the data record card. The ratios of the lever arms between the contact closing finger portions, 116*b* and 119*b*, and the sensing finger portions, 116*a* and 119*a*, of the members 116 and 119, and the spacings between the electrical contact members such as 107*a* and 107*b*, are such that a relative motion of only four-thousandths of an inch at the sensing finger extremities 119*a* and 116*a* is sufficient to affect positive opening or closure of the associated electrical contacts. The amplification of motion in the sensing fingers permits sufficient clearance between the open electrical contacts to meet all operating requirements of reliability and safety, and the minimum motion needed at the card surface enables the read-head to operate upon cards varying in thickness from twelve-thousandths of an inch to fifty-thousandths, without the sensing fingers ever penetrating more than one-third of the minimum card thickness. By reason of the adjustably positioned contact carrying bar 105, which is always referenced to the surface of the data card 66 through its mounting on reference member 113, this minimum motion required for contact closure remains constant regardless of variations in the thickness of data cards employed in the apparatus. Even with the thinnest cards the sensing finger portions such as 119*a* never completely penetrate the card so as to engage or contact a backing plate. Furthermore, since every two contact sensing members (such as 116 and 119) have their own common reference member (such as 113), the entire series of sensing members as employed in the preferred embodiment of the invention are individually referenced to that portion of a data card which each pair of sensing members engages so that minor differences in surface contour or card thickness as may occur from point to point in a given card, whether introduced by the presence of foreign matter, wrinkles, or other causes, are automatically compensated for in scanning the entire surface of the record to be sensed.

To facilitate reverse motion of the read-head, after scanning and sensing a series of data cards, a butterfly cam member 110, shown in cross section in FIGURES 18*a*, 18*b* and 18*c*, is rotatable about an axis 112, parallel to the axis of shaft 109, and is engageable with the extremities 119*c*, 113*c* and 116*c* of members 119, 113 and 116, respectively, to impart clockwise rotation to these members whereby they are all cammed up and out of sensing engagement with the surface of record data cards. This camming in and out facility is provided so that the sensing and reference fingers may be disengaged from the surface of a data card in order that the read-head my be returned from right to left (as viewed in FIGS. 9a and 9b) after each card reading operation is completed. FIG. 22 illustrates the "cam out" position of butterfly cam 110 with the end B thereof engaging the extremities 113c and 116c, respectively, of follower member 113 and sensing member 116 to disengage the sensing members 113a and 116a from the surface of a record card 66. FIG. 23 illustrates the butterfly cam 110 further rotated in a counterclockwise direction to a position where end B is disengaged from the extremities 119c and 113c, respectively, of sensing member 119 and follower member 113 to allow the corresponding sensing portions 113a and 119a to engage the surface of data card 66. As shown in FIG. 23, sensing finger portion 119a has entered card aperture 120 and the switch lever arm 119b has engaged spring contact 106b to close with the associated fixed contact 106a, while the reference finger portion 113a rides on the unperforated surface of card 66. As relative motion progresses between the sensing members of the read-head and a data card, the perforation sensing fingers in effect "measure" the width of card perforations or indentations by establishing continuous closure of their associated electrical contacts during the periods of partial penetration into the card recesses.

Spring bail 108 (FIGS. 16, 18a, 18c and 20) is also mounted on shaft 109, for swinging motion thereabout, against the tension of springs 108a through the operation of "bow tie" spring tensioning cam surfaces 110a in engagement with cam follower 115 which varies the spring loading on the sensing fingers as the butterfly cam 110 rotates to its different operating positions. Spring tensioning cam 110a is formed integrally with the butterfly cam 110 and the two rotate as a unit about their common axis 112. In the apparatus of the preferred embodiment two identical cam surfaces 110a are provided at opposite ends of cam 110 (as may be seen in FIGS. 14, 15 and 16) to engage corresponding cam followers 115 at opposite ends of the spring bail 108. The engagement of this cam surface 110a with the spring tensioning follower 115 is best illustrated in FIG. 20 of the drawing.

The mechanism which controls the camming in and camming out of butterfly cam 110 will now be described with particular reference to FIG. 16, FIG. 17 and FIG. 19 of the drawings. Opposite ends of the cam 110 are formed into upper and lower bearing shaft extensions 121 and 122, as shown in FIG. 15, and are journaled in the upper and lower castings 64 and 65 of the read-head 62. As shown greatly enlarged in FIG. 19, the lower end of cam shaft 122 is coupled through a unidirectional rotatable rachet drive mechanism, indicated generally at R, to a coaxial rotatable disk member or hub 130 having rigidly mounted on the upper and lower faces thereof pins 131—131a and 132—132a, respectively.

The detailed structure of the unidirectional ratchet drive mechanism is shown in sectional view FIG. 19A taken along the line 19A—19A of FIG. 19. This mechanism includes a ratchet disk 123 attached to the vertical cam shaft 122. Ratchet disk 123 is recessed on its under side and has teeth on its periphery which engage with spring pawls 124 mounted on a bracket 125 which extends from the under side of casting 65. Bracket 125 serves also to support in axial alignment with cam shaft 122 a toothed driving member 126 which is intermittently turned through 90° at the end of each movement of the read-head across the face of the cards, and also at the end of the return movement of the read-head, by engagement of pins 131 and 132 with cam dogs 127 and 128 which are fixedly supported on the frame of the card handling apparatus, as shown for example in FIG. 2 and FIG. 17. The cam dogs 127 and 128 project into the path of movement of the pins 131 and 132 as the read-head moves along its horizontal guide rails 61. Pins 131 and 131a project upwardly from rotatable hub 130 to engage cam dog 127, while the oppositely disposed pins 132 and 132a extend downwardly to engage cam dog 128, as shown in FIG. 16 and FIG. 17.

The operating sequence of the pin driven cam rotating mechanism may be understood by reference to FIG. 17 wherein four successive positions of the read-head are diagramatically illustrated by the respective positions of the rotatable pin members in relation to their associated engaging dog cams. At position A in FIG. 17, the read-head is at rest at the extreme left end of its traverse (as viewed in FIG. 9a) and the card sensing fingers are in their "cam out" position, the butterfly cam 110 engaging the "cam out" lever arms of all sensing fingers, being in the position shown in FIG. 22 as discussed hereinabove. Upon initiation of the card reading operation the read-head drive motor is energized and the read-head commences to move from left to right and the pin hub 130 advances from A to B in FIG. 17. As the pin 131 engages the "cam in" dog 127, hub 130 is rotated clockwise substantially 90° to the position illustrated at B in FIG. 17. The first portion of this rotation releases the butterfly cam 110 from restraining engagement with the sensing fingers which are then permitted to move from the position shown in FIG. 22 to that of FIG. 23.

At the moment of initial release of the sensing fingers no tension is applied to coil springs 108a so that the fingers are not forceably brought to bear against the surface of the data card, but as hub 130 continues its clockwise rotation through the first quadrant to the position shown at B in FIG. 17 the cam surfaces 110a (FIG. 20) come to bear upon spring tensioning roller 115 to swing the spring bail 108 to its normal operation position shown in FIG. 20 whereby the spring tension is gradually and uniformally applied to all of the sensing fingers. By this gentle application of tension all possibilities of erroneous operation due to finger bounce, false contact closure, or surface damage to the record cards is completely eliminated.

As the read-head continues its motion from left to right to complete the data sensing operation hereinabove described it finally reaches the position illustrated at C in FIG. 17 whereat the lower pin 132 on hub 130 engages the "cam out" dog 128, and hub 130 is rotated an additional 90° in the clockwise direction. This further 90° rotation imparted to butterfly cam 110 brings the opposite edge of this cam (A in FIG. 23) into operative engagement with the "cam out" projections on all of the read-head sensing fingers to thereby move these sensing members away from the data card surface and into the disengaged position of FIG. 22. With the read-head sensing fingers cammed out, the read-head drive motor reverses operation (by engagement of cam 59 with reversing switch 57) and the read-head again moves from right to left toward its home position, illustrated at A in FIG. 17. As the hub 130 passes cam dog 127 in its right to left motion, upper pin 131a strikes dog 127 and rotates hub 130 counterclockwise to the position shown at D in FIG. 17. As pin 131a would thus not be in a position to engage cam 127 upon the next passage of the read-head from left to right, it becomes necessary to impart a corrective clockwise rotation to pin hub 130 as it moves from right to left from position D to the home position at A. This is accomplished by a lower cam 133 (FIGS. 16 and 17) which engages lower pin 132a to impart the requisite clockwise rotation to hub 130 as the read-head completes the return to its home position at A.

An additional gating control finger member 111, as shown clearly in the enlarged drawings of FIG. 19 and FIG. 20, is also mounted on shaft 109 and is cammed in and out by means of butterfly cam 110 in the same manner and at the same times as the card data sensing fingers are operated upon. Gating finger 111 is positioned to contact a wear strip 112 attached to the face of the panel 67 immediately below the card supporting track 69 (as shown in FIG. 15). The opposite end of lever arm 111$a$ of member 111 forms a cam surface which engages a switch 111$b$ when all of the parts are in card reading position. The gating control wear strip 112 is cut away from engagement with the gating finger member 111 at those positions where recorded information appears in columns of the record data cards, as shown in FIG. 8 and FIGS. 9$a$ and 9$b$. The uncut or raised portions 112$a$ are positioned at the spaces between adjacent cards placed in the card handling apparatus (FIG. 8), and engagement of the gating finger member 111 with these portions operates to open normally closed switch 111$b$ which thereby removes all electrical potential from the sensing finger contact switches 106 to prevent the transmission of any erroneous signals from the transmitter apparatus to the compiler as the read-head passes over these spaces between adjacent cards. In this manner, the gating finger member 111 with its associated switch 111$b$ effectively edits transmission from the card handling apparatus to eliminate possible spurious signals during the transition of the read-head between adjacent cards. By preshaping of wear plate 112, and preselecting the position and length of raised portions 112$a$ therein, the card reading apparatus of the invention may be preset to read only selected columns of information recorded on data cards, and to edit out by deleting transmission from any undesired columns of data which may not be required in the particular transaction for which the apparatus is adjusted.

FIG. 24 illustrates an alternative structural arrangement in which the sensing finger members of the read-head, as here illustrated by sensing member 119 and surface follower member 113, may be mounted in a stationary position with the data record card 66 mounted on the surface of a cylinder or drum 220 for rotation beneath the read-head sensing members, in a counterclockwise direction as shown in FIG. 24. By this arrangement a prerecorded program of data signals may be continuously sensed and transmitted by the read-head of the invention. It will also be appreciated that with stationary mounting of the read-head as shown in FIG. 24 a plurality of data cards may be passed thereunder, from right to left, by conventional card handling apparatus, and the data recorded on such cards may thus be detected and converted into electrical signals by means of the card reading mechanism disclosed.

FIG. 25 illustrates a further alternative structural embodiment in which a flexible spring contact member 250 is normally in conductive engagement with a back contact member 251, but is moveable from disengagement therewith into conductive engagement with a forward fixed contact member 252 in response to counterclockwise rotation of data sensing member 119 upon engagement with a surface indentation or perforation in a data record element. The single pole double throw switch arrangement of FIG. 25 may be employed wherever the associated electrical circuitry requires the use of a transfer contact, and thereby may eliminate the need for substantial numbers of relays in such circuits. It will also be apparent that by provision of a back contact such as 251, the read-head apparatus of the invention may be employed to detect, sense, and signal data information recorded by raised elements or portions on the surface of a data card, as for example embossed code indentations such as braille. It will also be apparent that where the apparatus may be intended solely for detecting and reading such raised or embossed records, the forward contact 252 may indeed be eliminated and the back contact between members 250 and 251 will be closed only upon engagement of the sensing finger member 119 with such a raised record portion.

Attached to the frame of the card handling apparatus, adjacent to the path of movement of the read-head, are a number of switches such as 55 and 57 as shown in FIGS. 9$a$ and 9$b$. A pair of cam members 59 and 59$a$, at least one of which may be adjustably positioned, are mounted on the lower casting 65 of the read-head (as shown in FIG. 15) in a position to engage the contact rollers of the switches 55, 57 and 58 as the read-head passes over them. These switches 55—58 are connected into the circuits of the relays which serve to initiate operation of the variable data readout device of the variable information circuits, and to restore certain parts of the apparatus (including the moveable read-head) to their original positions after completion of each transmission operation, as will be explained in the description of the transmitter operation, in particular reference to the circuit diagrams of FIG. 28 and FIG. 29. FIG. 26 and FIG. 27 disclose the structure of the rotary scanning apparatus which is employed to successively transmit the variable information data, from the operator's manually adjusted dials and from the internal plug board array, to the Compiler over the interconnecting multiple conductor cable. As shown in FIGS. 26 and 27 this scanner comprises essentially a rotary sweep contactor 51 mounted on a vertical shaft 52 driven by an electric motor 53 through a suitable gear reduction train 53$a$ to successively contact a plurality of circumferentially spaced contact points 54 which are connected to the several variable data input sources. Cam operated microswitches 17 and 18 serve to initiate and interrupt operation of the motor 53 when appropriate relays in the control circuits of the apparatus are energized as will now be described more fully with reference to the circuit diagrams.

*Operation of the Transmitter*

The transmitter control circuits will now be described with particular reference to the circuit diagrams, FIGURES 28 and 29, which are to be considered as interconnected by conductor lines $a$ through $h$. For ease in following the various circuits, all A.C. common connections are shown as heavy lines in both figures. In the operation of the transmitter, the operator places the requisite number of cards into their proper slots in the transmitter and sets the transaction code dial 21 and one or more of the variable information dials 27, preparatory to initiating transmission.

Upon placing the cards in their proper positions, switches 87 are closed by the cards, each switch 87 operating a "card-in" relay A, B, or C, as shown in FIGURE 29. Relays A, B, and C operate the contacts of relay tree 300 and open series contacts 242 when energized. Depending upon the type of information to be transmitted, any desired combination of cards may be inserted into the transmitter, and the combination of cards present will result in a predetermined circuit through relay tree 300, terminating at a contact of transaction code dial 21, as for example contact 43 in FIGURE 29. Unless transaction code dial 21 is set at the proper number or position, the output from the relay tree will terminate at an open contact on transaction code dial 21. For the purposes of illustration, we will assume that three cards are required for the transaction to be described. With three cards inserted in the transmitter, it will be seen that a circuit is completed from the A.C. line through relay tree 300, through dial interlock switch 40 (FIGURE 28), and back to contact 43 of transaction code dial 21. The interlock switch 40 may be in series with any or all of the contacts on code dial 21 as desired. If dial 21 is properly set to contact 43, a circuit is completed through contact arm 21$a$ to energize relay 310 (FIGURE 28). Thus, to complete the initial operating circuit through relay 310, the correct combination of cards must be inserted, the transaction code dial must be at the proper setting, and, if required for the particular code selected, dial interlock switch 40 must be closed by the turning of the required variable information dials 27.

The energization of relay 310 closes contacts 320 and

241. The closing of contact 320 completes the A.C. common circuit to one side of relay 208, and the closing of contact 241 provides a circuit through solenoid 87*a* when transmit button 7 is closed.

With the transaction code dial at its correct setting, the variable information dials at their required settings, and the required number of cards inserted, the operator now presses the transmit button 7. The closing of transmit button 7 energizes solenoid 87*a* which rotates cam 82 through 60 degrees. The rotation of cam 82 closes switch 88 and transfers the position of switch 88*a* from contact 246 to contact 247, breaking the circuit through solenoid 87*a*. The rotation of cam 82 also operates the card-clamping fingers to secure the cards in their places. The closing of switch 88 completes a circuit through carriage-operating solenoid 75, switch 99*a* and relay contact 330 normally being closed when the card carriage is in its uppermost position. Energization of carriage-operating solenoid 75 provides downward movement of the card carriage and lowers the cards into the transmitter.

As the card carriage reaches the bottom of its travel, switch 99*a* is opened and the position of switch 99 is transferred from contact 210 to contact 212 and, as the card carriage reaches the bottom of its travel, it is secured by a latch 89. For insuring the proper seating of the inserted cards, a parallel network of switches 91 and contacts 91*a*, 91*b*, and 91*c* is utilized. Contacts 91*a*, 91*b*, and 91*c* are operated by relays A, B, and C, respectively, to open when the corresponding relay is energized. Thus if three cards have been inserted, contacts 91*a*, 91*b*, and 91*c* will be open, requiring proper seating of the cards to close all the switches 91 and complete a circuit to energize relay 208.

Energization of relay 208 closes contacts 248, 249, and 207. The closing of contact 248 completes a circuit to the Compiler sending a "ready to transmit" signal through cable 279, and the closing of contact 249 lights the "ready to transmit" signal light 276. The closing of contact 207 energizes relay 37 which closes contacts 243 and 245. The closing of contact 245 will complete a circuit through relay 204 when contacts 242 have been closed, but since contacts 242 have been opened by the relays A, B, and C by the insertion of the cards, a circuit through relay 204 is open until the cards have been withdrawn from the carriage, again closing contacts 242. Relay 204 may also be energized by closing release button 8, the function of the release button being described more fully hereinafter.

Contact 243 is in the circuit with switches 42, switches 42 being connected in parallel. The circuit through contact 243 and switches 42 is a holding circuit for relay 37 and keeps relay 37 energized if any one of switches 42 is closed. Each switch 42 is operated by a variable information dial 27, and the turning of any variable information dial from its zero position will close a switch 42 to complete a circuit through relay 37 when contact 243 has been closed.

Switches 41 are also connected in parallel and are similarly closed by turning the variable information dials 27 from their zero position. Each switch 41 will complete a circuit through a motor 33 when contact 205 is closed. The motors 33 are connected to the variable information dials 27 and turn these dials back to their zero positions when the cards are removed from the transmitter closing contacts 242, or if release button 8 is closed. It will thus be seen that the operation of motors 33 is dependent upon the closing of contact 205, which is in turn dependent upon the energization of relay 204. Energization of relay 204 is dependent upon the closing of contact 245 which is dependent upon the energization of relay 37. Therefore, whenever a variable information dial 27 is turned from zero position, closing a switch 41 and a switch 42, and contacts 242 are closed by the removal of the cards, the motors 33 will be energized to return all of the variable information dials back to their zero positions. Relay 37 will remain energized by the holding circuit through switches 42 and contact 243. When the variable information dials reach their zero position, the switches 41 and 42 are again opened, breaking the circuit through motors 33 and deenergizing relay 37 which restores all contacts to their initial positions.

As described above, the energization of relay 208 indicates that the cards are properly seated. When the Compiler is ready to receive the information to be transmitted, relay 250 is energized from the Compiler through cable 279, closing contacts 251, 252, and 267, and opening contacts 254 and 255. The opening of contact 255 prevents the energization of card and carriage-release relay 221 during the transmission cycle. The opening of contact 254 prevents the energization of relay 204 should release button 8 to be closed during the transmission cycle. The closing of contact 267 illuminates the transmitting signal light 277. The closing of contact 251 completes a circuit through normally-closed contact 256, energizing solenoid 315, engaging clutch 53*a* of motor 53 (FIGURE 29). Motor 53 is running whenever the transmitter is turned on, and the engagement of clutch 53*a* rotates the read-out sweep 51 (FIGURE 29). As read-out sweep 51 rotates, it completes successive circuits through contacts 54 on printed circuit 50. Contacts 54 are connected to the settings on the variable information dials 27 and to settings on decks 21*b* and 21*c* on the transaction code dial. As the read-out sweep 51 rotates, the information set up on these dials is transmitted to the Compiler as sweep 51 passes over contacts 54.

The information that is transmitted by read-out sweep 51 may be of several types. Upon starting, sweep 51 will encounter a contact 54 that is connected to deck 21*c* of transaction code dial 21. The setting of transaction code dial 21 determines which contact 21*c* will be connected to the first contact 54 as sweep 51 begins its rotation. The information set on dial 21*c* is a "length of message" number. This length-of-message number is not recorded but is "stored" by the Compiler to be compared against the total number of message impulses received by the Compiler. If the length-of-message number received by the Compiler differs from the number of impulses received, an error circuit is completed to the transmitter, and the error is recorded by the Compiler.

Another contact 54 encountered by sweep 51 as it rotates is connected to deck 21*b* of the transaction code dial. The selection of connections on deck 21*b* is also determined by the setting of transaction code dial 21. The information transmitted from deck 21*b* to the Compiler is a data classification number. This number is recorded by the Compiler and classifies the information following it from the settings of the variable information dials and from the information cards.

As read-out sweep 51 nears the completion of one revolution, switch 17 is momentarily closed, energizing relay 253 through closed contact 252. The energization of relay 253 closes contacts 257, 258, and 259 and opens contact 256. As described above, clutch solenoid 315 is energized through normally-closed contact 256. Solenoid 315 will remain energized however, until the completion of one revolution through switch 18. Switch 18 is a "homing" switch and is closed whenever sweep 51 is off the start position. Thus, after contact 256 opens, switch 18 will keep solenoid 315 energized until sweep 51 again reaches the start position.

The closing of contacts 257, 258, and 259 initiates the operation of the read-head in scanning the information cards. The closing of contact 259 completes a holding circuit for relay 253, relay 253 being held until relay 250 is de-energized at the termination of transmission, opening contacts 252. The closing of contact 257 completes a circuit to read-head motor 101 through contact 265 which is normally at its R position, causing the read-head to scan the information cards from left to right. As the read-head scans the information cards, switches 106 (FIG- URE 29) are selectively closed and opened as the sensing fingers 116 pass over the perforations in the information cards. The impulses from the closing of switches 106 are then sent to the Compiler through appropriate lines in cable 200.

As can be seen in FIGURE 29, completion of a circuit through any of the switches 106 is dependent upon the closing of the gating finger switch 111*b*. The opening and closing of this gating finger switch provides a gate for information to be sent to the Compiler, i.e. in order for an impulse to be sent to the Compiler switch 111*b* and a switch 106 must be closed simultaneously. This gating relationship of switch 111*b* permits only the desired portion of information to be transmitted from the information cards.

To actuate switch 111*b*, the information cards themselves may be perforated to open and close switch 111*b* at the desired times. Switch 111*b* may also be operated by a gating slug 412 (FIGURES 9A and 9B) that opens and closes switch 111*b* as the read-head moves over the cards. The gating slug is aligned with the perforations on the cards and permits switch 111*b* to close only when fingers 116 pass over data information (perforations) desired to be transmitted. Thus it can be seen that the selection of the proper gating slug, information card, and transaction code dial setting is essential to record an error-free transmission of data. Use of either the wrong card or wrong gating slug will result in a wrong "length of message" for the transaction code selected and will actuate the error detection circuits in the Compiler.

As the gating finger switch 111*b* may alternatively be connected directly to the Compiler to function as a gate, a similar gate 326 must be provided for the read-out sweep 51 circuit in order to actuate recording in the Compiler. As read-out sweep 51 rotates, switch 326 is closed, permitting recording of the data from the sweep. Switch 326 is, of course, open when readout sweep 51 is at its home or idle position, so that there is no interference with the function of switch 111*b* when the cards are read.

Movement of the read-head from its home position closes switch 56 in the circuit of relay 253 and transfers switch 55 from its R to L position. Switch 56 keeps relay 253 energized when relay 250 is de-energized (after the completion of transmission), for the return of the read-head to its home position. When the read-head is returned to this position, switch 56 is again opened by engagement with the read-head, and relay 253 is de-energized.

At the completion of the left-to-right movement of the read-head, switch 57 is closed, energizing relay 262 through switch 55 which is now at its L position. The energization of relay 262 closes contacts 264 and 261 and transfers contact 265 from its R to L position. The transfer of contact 265 to its L position reverses the read-head motor 101 to return the read-head from right to left and to its initial position. Switch 58 (FIGURE 9B) is also closed at the completion of the left-to-right movement of the read-head, signaling an end of message to the Compiler. The closing of contact 264 completes a holding circuit through contact 55 for relay 262 so that relay 262 remains energized for the return movement of the read-head, since switch 57 is opened when the read-head begins its return. At the completion of the return travel of the read-head, switch 55 is again returned to its R position, which de-energizes relay 262.

Relay 250 is de-energized by the Compiler during the return of the read-head, closing contacts 254 and 255 and opening contacts 267, 252, and 251. Relay 253 remains energized, however, as switch 56 is closed until the read-head completes its return travel. When the read-head reaches its initial or home position, switch 56 is again opened, de-energizing relay 253. De-energization of relay 253 opens contact 257, cutting off power to read-head motor 101.

With relay 250 de-energized by the Compiler during the return movement of the read-head, a circuit is completed through contacts 255, 261, and 263, which energizes card and carriage release relay 221. The energization of relay 221 closes contacts 340, 211, and 213 and opens contact 330. Contact 340 is a holding circuit for relay 221, keeping 221 energized after contact 261 has been opened by de-energization of relay 262. The closing of contact 213 completes a circuit through solenoid 90, which releases the latch 89 on the card carriage. As the card carriage is provided with springs urging it upwardly, the carriage begins its upward movement, returning switch 99 to its 210 position, which completes a circuit through now-closed contact 211 to energize solenoid 87*a*. The opening of contact 330 prevents energization of solenoid 75 and a premature relowering of the carriage, as switch 99*a* is again closed as the carriage nears its topmost position. Solenoid 87*a* again rotates cam 82 through a 60 degree cycle, opening switch 88 and transferring switch 88*a* from contact 247 to contact 246, which de-energizes solenoid 87*a*. The rotation of cam 82 also releases the card-clamping fingers, permitting the cards to be withdrawn from the transmitter. The transfer of switch 88*a* from contact 247 to contact 246 breaks the holding circuit through contact 340 and de-energizes relay 221, returning all contacts to their initial positions.

As described above, the Compiler is also provided with error-detecting circuits, and in the event that an error is recorded, relay 270 is energized from the Compiler through cable 279, closing contact 275 which energizes relay 271. Energization of relay 271 closes contacts 272 and 273 and opens contacts 263 and 278. The opening of contact 263 prevents the energization of carriage and card-release relay 221 unless release button 8 is operated. This keeps the card carriage latch in its holding position, and the transmit cycle may be repeated by manual operation of the transmit button 7. If desired, the transmit button 7 circuit may be automatically operated by a relay energized from the Compiler for a repeat of one transmission cycle, in case the error has been made by the system rather than by the operator. Operation of the transmit button 7 breaks the circuit through relay 271. Contact 258 is a by-pass for transmit button 7 in this circuit so that relay 271 will remain energized until the de-energization of relay 253, to permit completion of the read-head cycle. The closing of contact 273 illuminates the error signal light 274. The closing of contact 272 provides a holding circuit for relay 271, keeping 271 energized until relay 253 is de-energized and transmit button 7 is operated. The opening of contact 278 prevents the energization of relay 208 until relay 271 is de-energized.

At various phases during the operation of the transmitter, it may be desirable to release the cards and begin the operation again. A release button 8 is provided in the transmitter for this purpose. The operation of the release button 8 will now be described under two conditions of operation.

If the cards which have been inserted into the carriage are improperly seated, switches 91 will not close when the carriage reaches its down position. Thus relay 208 will remain de-energized, and the "ready to transmit" light 276 will not be illuminated. With the transmitter in this condition, the release button 8 may be closed to return the card carriage to its upper position and the variable information dials 27 to their zero positions. Closing of the release button 8 will bypass contacts 242 which have been opened by the "card in" relays A, B, and C. Thus a circuit is completed through relay 204 since release button 8 also energizes relay 37, closing contacts 245 and 243, relay 37 being held by contacts 42 until the variable information dials are returned to zero. The closing of the release button 8 also energizes carriage and card-release relay 221 through contact 255 and switch 55 which is normally in its R position. Upon the energization of relay 221, contact 340 will again hold relay 221 until cam 82 has completed its cycle of 60 degrees, returning switch 88a to its contact 246 position.

Another embodiment of the release button circuit prevents the return of the variable information dials to zero until after a transmission cycle. This may be accomplished by keeping a contact open in the circuit of relay 204 through release button 8 until the relay 250 is deenergized after a transmission cycle. With such a circuit arrangement, the cards and carriage can be released and the cards changed or reseated without necessitating manual resetting of the variable information dials 27 before again lowering the cards in preparation for the transmission cycle.

It will be noted that the release button 8 cannot function during the transmission cycle of the transmitter, as relay 250 is energized during the transmission cycle and contacts 254 and 255 are opened. Contact 254 is in the circuit of relay 204, and contact 255 is in the circuit of relay 221. Thus contacts 254 and 255 prevent a release of the card carriage or the return of the variable information dials to zero during the transmission cycle.

The operation of release button 8 provides a bypass to card and carriage release relay 221 when relay 271 has been energized by an error signal from the Compiler and contact 263 is opened. It will be noted that the operation of release button 8 will not complete a circuit to relay 221 until the read-head has returned to its home position and switch 55 is at its R position, which occurs upon the return of the read-head to its initial or home position. Thus, if an error signal has been received from the Compiler or if the information cards have been improperly seated, the operation of release button 8 will return the card carriage to its uppermost position and the variable information dials 27 to zero, provided that the transmitter is not transmitting and that the read-head has returned to its home position, where the sensing fingers are disengaged from the card surfaces.

The foregoing description of the variable information control circuits has referred mainly to the relation between the variable information input dials and the read-out sweep scanner, with the associated error control interlock circuits. However, it is to be understood that other forms of selected information may be inserted into the transmitter apparatus, either by the operator or by external connection to other automatic devices. Additional information may be manually inserted, whenever called for, by operation of the keys marked "+," "N," and "−" (FIGURE 1). Operation of these keys controls switches 327 and 328 (FIGURE 29) to route information from the read-out sweep to various recording circuits in the Compiler. Thus, for example, if a particular transaction transmission is to contain inventory information, operation of the "+" key will transfer switch 328 to its lower position to record a plus symbol on the punched tape, indicating that the data set on the transmitter dials is to be added to existing records. Alternatively, if the transaction involves a withdrawal from inventory, operation of the "−" key transfers switch 327 to its lower position to record a minus symbol on the Compiler tape. Operation of the "N" key will restore switches 327 and 328 to their normal positions, and operation of the "+" or "−" key will release either previously-depressed key. The keys, and their symbols as recorded at the Compiler, may be accorded any prearranged significance in the interpretation and processing of the data record. It is to be understood that different symbols may be associated with these keys, as may be desired, and that either a greater or lesser number of such keys may be provided, depending upon the operational requirements of the apparatus. It is further to be understood that in the preferred embodiments of the invention, the connections from these symbol keys to the sweep scanner pass through contacts of the transaction code dial, in the same manner that the variable information dials are connected with the transaction code dial, so that operation of the keys when uncalled for by the transaction code has no effect on the data transmitted, and failure to operate the keys when their operation is required by the selected transaction code will record an error symbol at the Compiler and operate the error signal at the transmitter, in the same manner as described with reference to the variable information dial control and interlock circuits shown in FIGURES 28 and 29.

In addition to reading and transmitting information from data cards and from the manually-operable variable dials and keys, further variable input information may be inserted directly into the transmitter apparatus of the invention by connection thereof with such remote devices as electrically-indicating counters, flow meters, thermometers, pressure gauges, etc. Such devices may be connected through the internal plug boards of the apparatus to selected contacts on the variable information readout sweep scanner, whereby information from such external detectors may be transmitted automatically, along with the other input data, to the central Compiler. One use of such an arrangement is in the manufacturing plants where repetitive machine operations are performed by tools or dies which must be replaced after a predetermined number of operations in order to maintain required manufacturing tolerances. A counter on the machine, when connected to the apparatus of the invention, will record at the central office, whenever a job report or transaction is transmitted, the total number of operations performed (which may differ from the total number of units manufactured). Other uses of this automatic data input capability are in the process industries where such factors as temperature, pressure, humidity, etc., may be transmitted to a Compiler and recorded automatically along with data from punched cards and from the manually-operated data input controls.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described our invention, what we claim as new and desire to secure by Letters Patent is:

1. In apparatus of the class described, means at a transmitting station for reading a plurality of data bearing cards comprising, in combination; a plurality of data card receptors movable together with data cards inserted therein between card receiving and card reading positions, a first plurality of switches each associated with one of said card receptors and actuated by insertion of a data card therein, and a second plurality of switches each associated with one of said card receptors and actuated by the arrival at said card reading position of a data card inserted therein, said switches connected in circuit to establish a predetermined circuit condition only when each and every data card inserted in a receptor has arrived at its reading position.

2. The combination defined in claim 1 and data card reading means operable only when said predetermined circuit condition is established to read the data borne by said data cards.

3. The combination defined in claim 2 wherein said data card reading means comprises a card reading head movable relative to the surface of said cards in said reading position for reading the data borne by said cards.

4. The combination defined in claim 3 wherein each said data card receptor is returned to said card receiving position at the conclusion of the card reading movement of said reading head.

5. In apparatus of the class described, input data validation means at a transmitting station comprising in combination; data card reading means comprising a plurality of data card receptors, circuit controlling means actuated by insertion of a data card into each of said data card receptors, a plurality of separate circuits each conditioned by said circuit controlling means upon insertion of data cards into a preselected combination of said receptors, and data card reading control means selectively connectable to each of said separate circuits to prevent reading of data cards if a preselected combination thereof has not been received in said receptors.

6. The combination defined in claim 5 wherein said data card reading control means comprises a movably actuatable means which additionally establishes a selected electrical circuit corresponding to one of a plurality of transaction codes when connecting said data card reading control means to one of said separate circuits.

7. The combination defined in claim 6 and means for rendering said movably actuatable means inoperable during reading of said data cards.

8. The combination defined in claim 5 and a plurality of manually actuatable data input means including at least one switch actuated when data is set into at least one of said data input means, said switch connected in at least one of said separate circuits.

9. The combination defined in claim 8 and means for rendering said data input means inoperable during reading of said data cards.

10. The combination defined in claim 8 and reading means for reading the data set into said data input means, and wherein said data input means are further rendered inoperable during reading thereof, and means for restoring said data input means to a home position after reading thereof.

11. The combination defined in claim 5 wherein said data card receptors comprise card clamping means under control of said data card reading control means for retaining cards inserted in said receptors in fixed positions relative to said receptors when said control means is connected to the separate circuit conditioned by said circuit controlling means.

12. The combination defined in claim 11 wherein said data card receptors are movable together with data cards inserted therein between card receiving and card reading positions, and a first plurality of switches each associated with one of said card receptors and actuated by insertion of a data card therein, and a second plurality of switches each associated with one of said card receptors and actuated by the arrival at said card reading position of a data card inserted therein, said switches connected in circuit to establish a predetermined circuit condition only when each and every data card inserted in a receptor has arrived at its reading position.

13. The combination defined in claim 12 and a plurality of manually actuatable data input means including at least one switch actuated when data is set into at least one of said data input means, said switch connected in at least one of said separate circuits.

14. In apparatus of the class described, input data validation means at a transmitting station comprising in combination; a plurality of data input means, a plurality of circuit controlling means actuated by said plurality of data input means, circuit means under control of said circuit controlling means conditioning one of a plurality of separate circuits when data is set into a preselected combination of said data input means, and data transmission initiating means selectively connectable in circuit with one of said separate circuits.

15. In an apparatus of the class described, the combination comprising a plurality of manually-adjustable data input controls for preselecting a plurality of different electrical circuits; a data card scanning mechanism comprising a card holder, a reading head, means for moving said reading head across the face of cards in said card holder, said reading head having electrical contacts which are successively closed during the movement of said head over the surface of data cards; a plurality of conductors for connection to a distant receiving apparatus, and means for successively connecting the first-mentioned circuits and the circuits of the contacts of said reading head to said conductors; and further means responsive to a signal on one of said conductors for restoring said data input controls to their respective initial positions.

16. In an apparatus of the class described, the combination comprising a plurality of manually-adjustable data input controls for setting up a multiplicity of different electrical circuits, a data card scanning mechanism including card holding and positioning means, a data card reading head movable across the cards so held, driving means for moving said reading head, means for restoring said manually-adjustable data input controls to their respective initial positions, a plurality of conductors for connection to a distant receiving apparatus, a read-out device for connecting said first-mentioned circuits to said conductors, at least one of said conductors completing a control circuit extending from said distant recording device to said apparatus, and means at said apparatus operable by said control circuit for preventing the restoration of said manually-adjustable data input controls to their initial positions.

17. The apparatus of claim 16 including means for effecting a second scanning operation of said reading head and said read-out device before said manually-adjustable data input controls are so restored.

18. In an apparatus of the class described, means for receiving punched data cards, a data reading head movable across the face of cards in said card receiving means, said reading head having a plurality of electrical switches corresponding to data positions on said cards, movable supports for said switches spring biased toward the surface of said cards, said supports having member portions engaging unperforated portions of said cards, scanning members having fingers positioned to pass over the perforations in said cards during the movement of the reading head, said members being spring biased toward the surface of said cards, and said scanning members having portions in engagement with the movable members of said switches, to thereby close said switches on relative movement between said supports and said scanning members as said scanning members enter perforations in said cards.

19. The apparatus of claim 18 including means for moving said supports and said members away from their card engaging positions during the reverse movement of said reading head.

20. In an apparatus of the class described, means for supporting cards having data indicating areas, a reading head movable across said cards, switching means on said reading head engageable with said data indicating areas for selectively effecting a plurality of electrical connections, a further switch carried by said reading head, means comprising a movable member on said reading head for closing and opening said further switch, and a track engaged by said movable member having selectively positioned projections engaging and operating said movable member during movement of said reading head across said cards.

21. The apparatus of claim 20 including means for moving the card engaging members and the track engaging member away from their card and track engaging positions on the reverse movement of said reading head.

22. Data conversion apparatus for converting mechanically stored, surface differentiated fields of information into electrical signals comprising, in combination, signal generating means including a sensing finger and a reference finger, means adapted to bias said fingers into simultaneous and substantially continuous engagement with the surface differentiations of a record medium bearing surface recorded mechanically stored fields of information, said fingers engaging said surface at points immediately associated with said stored information in said medium, circuit controlling means actuated by relative displacement of said fingers, and means for imparting relative motion between said signal generating means and the surface of said information bearing record medium.

23. The combination defined in claim 22 further defined in that said relative motion between said signal generating means and the information bearing record medium is substantially normal to a line joining the said points of surface engagement of said fingers.

24. The combination of claim 23 in which said motion is continuous during the reading of each field of stored information.

25. The combination of claim 22 in which said fingers are mounted for motion about a common axis.

26. The combination of claim 22 in which said circuit controlling means comprise electrical contacts mounted to one of said fingers and engageable with the other said finger, said contacts adapted to be opened and closed by relative motion between said fingers.

27. In data communications apparatus, data reading means adapted to sense prerecorded symbols in the form of surface deviations on data record media, comprising, in combination, a plurality of pivotally mounted sensing finger members movable arcuately about a common pivotal axis in response to engagement with surface recorded symbols of predetermined character, a reference finger member independently mounted for pivotal motion about the same common axis as said sensing finger members, an electrical contact carrier mounted on said reference finger member and movable therewith about said common axis, a plurality of separately operable electrical circuit control members mounted on said contact carrier, each of said circuit control members individually engageable with at least one of said sensing finger members and operable thereby upon arcuate displacement of said sensing finger members with respect to said reference finger member, means for normally biasing said finger members into engagement with the surface of a record medium, and means for producing relative motion between the surface of said record medium and the engaging portions of said finger members, whereby said circuit control members are individually and selectively operated in accordance with a prerecorded pattern of surface deviations in said record medium.

28. The combination of claim 27 including cam operated means for disengaging said finger members from the surface of a record medium at selected intervals and for re-engaging said members in accordance with a prearranged program control.

29. The combination of claim 27 in which said cam operated means includes restraining means engageable with all of said finger members and movable successively into engagement and disengagement therewith in sequence governed by predetermined relative motion between said finger members and a record medium.

30. The combination of claim 29 in which said restraining means includes further cam means operable therewith to vary the tension of spring loaded means normally biasing said finger members into engagement with the surface of a record medium, said bias being at a relatively low tension upon initial engagement of said finger members with said record surface and increasing in tension as said further cam means advances to a normal operating position.

31. In data communications apparatus, data reading means adapted to sense prerecorded symbols in the form of surface deviations on data record cards comprising, in combination, a plurality of pivotally mounted sensing finger members movable arcuately about a common pivotal axis in response to engagement with surface recorded symbols of predetermined character, a reference finger member independently mounted for pivotal motion about the same common axis as said sensing finger members, an electrical contact carrier mounted on said reference finger member and movable therewith about said common axis, a plurality of separately operable electrical circuit control members mounted on said contact carrier, each of said circuit control members individually engageable with at least one of said sensing finger members and operable thereby upon arcuate displacement of said sensing finger members with respect to said reference finger member, spring loaded means for normally biasing all of said finger members into engagement with the surface of a record medium, cam operated means for varying the tension of said biasing means from a nominal value upon initial engagement of said finger members with said record surface to a higher value thereafter, further cam operated means integral with said first cam operated means and movable therewith into finger restraining and finger releasing positions, whereby said further cam operated means in its finger restraining position restrains all of said finger members against the tension of said biasing means and from engagement with said record surface, and means for producing relative motion between the surface of said record medium and the engaging portions of said finger members when said further cam operated means is in its finger releasing position, whereby said circuit control members are individually and selectively operated in accordance with a prerecorded pattern of surface deviations in said record medium.

32. The combination of claim 31 in which each of said circuit control members comprises an electrical transfer contact member normally biased into conductive engagement with a first contact point and disengageable therefrom and movable into conductive engagement with a second contact point upon deflection of its associated sensing finger member in response to engagement thereof with a prerecorded surface symbol of preselected character.

33. In data information transmission apparatus, the combination comprising means for receiving a plurality of data record cards, means for clamping said cards in said receiving means, further means for withdrawing said receiving means and clamped cards into a predetermined position within the data transmission apparatus, a card surface sensing data detecting read-head within the apparatus and engageable with a surface of said cards at said predetermined position, driving means for imparting relative motion between said read-head and said card receiving means, further means for preventing operation of said driving means except when said card receiving means and cards clamped therein are properly seated at said predetermined position, a plurality of switching means in said read-head responsive to engagement thereof with surface recorded data symbols on said cards to selectively operate a corresponding plurality of electrical signaling circuits, gating signal means on said read-head engageable with signal gate control means at preselected positions of relative motion between said read-head and said data cards to selectively generate a gate signal, and means for releasing and restoring said card receiving means to its initial position and for unclamping said cards after completion of a card sensing operation by said read-head.

34. The combination of claim 33 including manually adjustable data input means selectively operable to condition selected circuits of said plurality of signaling circuits for successive operation, circuit scanning sweep means connected between said plurality of circuits and said manually adjustable selective means, and means for sequentially operating said sweep means and said card sensing read-head to transmit in a predetermined sequence successive signals corresponding to the combined information recorded on said data cards and preset on said manually adjustable data input means.

35. The combination of claim 34 in which at least one of said manually adjustable input controls includes interlock means whereby said control must be operated before said sweep scanning means and said card sensing read-head become operable.

36. The combination of claim 35 in which the circuit selection by operation of said one manually adjustable input control establishes a predetermined circuit pattern by which one or more of the remaining manually adjustable input controls must be operated in order to condition the sweep scanning means and the card sensing read-head for operation.

37. The combination of claim 36 in which failure to operate one or more of said remaining manually adjustable input controls in accordance with said predetermined pattern produces an error signal on one of said signaling circuits and at said data transmitting apparatus.

38. In an apparatus of the class described, the combination comprising a plurality of manually adjustable data input controls for preselecting a plurality of different electrical circuits; a data card scanning mechanism comprising a card holder, a reading head, means for moving said reading head across the face of cards in said card holder, electrical switches on said reading head each of which is adapted to be actuated when an associated sensing member senses an information unit on a card in the card holder; a plurality of conductors for connection to a distant receiving apparatus, and connecting means for successively connecting the first mentioned circuits and the circuits of the switches of said reading head to said conductors; and further means for automatically restoring said means for moving the reading head and said manually adjustable controls and said connecting means to their respective initial conditions at the termination of a transmission.

39. Information sensing apparatus comprising card holding means adapted to hold at least one card having information in rows punched or embossed thereon, a finger associated with each of said rows of information on said cards, which finger is adapted to change the state of an electric circuit when said finger comes in contact with one of said information units, positioning means adjacent each said finger and positioned so as to avoid contact with said information units and adapted to sense the surface of the said card near said adjacent finger and to adjust the position of said adjacent finger relative to the surface of said card, and means adapted to cause the movement of said fingers relative to said card so that each finger contacts each information unit in the row with which the last mentioned finger is associated.

40. Apparatus as claimed in claim 39, wherein each finger is adapted to have a substantially fixed position relative to the adjacent positioning means when the finger is not in contact with one of said information units, and each finger is adapted to change its position relative to the positioning means so as to open or close an electric switch when the finger comes into contact with one of said information units.

41. Apparatus as claimed in claim 20 wherein the said further switch is adapted to provide a gating signal for controlling the transmission of signals produced by said switching means.

42. Sensing means in apparatus of the class described for sensing binary information units of an elongated information channel recorded as surface deviations on a recording medium comprising, in combination, a first pivotally mounted reference finger, a pivotally mounted sensing finger, means biasing said reference finger into engagement with the surface of said recording medium closely adjacent to the information channel and biasing said sensing finger into engagement with the surface of said recording medium coincident with the information channel and circuit controlling means actuated by relative pivotal movement of said sensing and said reference fingers.

43. Sensing means in apparatus of the class described for sensing binary information units of an elongated information channel recorded as surface deviations on a recording medium comprising, in combination, a first movably mounted reference finger, a movably mounted sensing finger, means biasing said reference finger into engagement with the surface of said recording medium closely adjacent to the information channel and biasing said sensing finger into engagement with the surface of said recording medium coincident with the information channel and circuit controlling means actuated by relative movement of said sensing and said reference fingers.

References Cited in the file of this patent

UNITED STATES PATENTS

| | | |
|---|---|---|
| 1,801,981 | Rogal et al. | Apr. 21, 1931 |
| 2,034,260 | Johnstone | Mar. 17, 1936 |
| 2,374,790 | Terry | May 1, 1945 |
| 2,475,307 | Brand et al. | July 5, 1949 |
| 2,657,338 | Williams | Oct. 27, 1953 |
| 2,679,602 | Gallagher | May 25, 1954 |
| 2,702,380 | Brustman | Feb. 15, 1955 |
| 2,708,267 | Weidenhammer | May 10, 1955 |
| 2,757,866 | Johnson | Aug. 7, 1956 |
| 2,869,790 | Radke et al. | Jan. 20, 1959 |
| 2,983,443 | Robinson et al. | May 9, 1961 |
| 3,025,498 | Blodgett | Mar. 13, 1962 |

UNITED STATES PATENT OFFICE
CERTIFICATE OF CORRECTION

Patent No. 3,109,089 October 29, 1963

Andrew Craig Reynolds, Jr., et al.

It is hereby certified that error appears in the above numbered patent requiring correction and that the said Letters Patent should read as corrected below.

Column 1, line 52, after "apparatus" insert -- is --; column 2, line 70, for "transmisson" read -- transmission --; column 5, line 45, for "tarnsmitter" read -- transmitter --; line 59, for "adjsuted" read -- adjusted --; column 10, line 37, for "66" read -- 66' --; column 12, lines 3 and 4, for "corresonding" read -- corresponding --; column 13, line 1, for "my" read -- may --; column 18, line 17, strike out "to"; column 25, line 52, for the claim reference numeral "27" read -- 28 --.

Signed and sealed this 21st day of April 1964.

(SEAL)
Attest:

ERNEST W. SWIDER
Attesting Officer

EDWARD J. BRENNER
Commissioner of Patents